(12) United States Patent  
Ramu et al.

(10) Patent No.: US 7,420,308 B2  
(45) Date of Patent: Sep. 2, 2008

(54) PMBDCM AND TWO PHASE SRM MOTOR, TWO PHASE SRM ROTOR AND STATOR, AND COIL WRAP FOR PMBDCM AND SRM MOTORS

(75) Inventors: Krishnan Ramu, Blacksburg, VA (US); Amanda Martin Staley, Christiansburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 2 days.

(21) Appl. No.: 10/999,218

(22) Filed: Nov. 24, 2004

(65) Prior Publication Data

US 2005/0156475 A1    Jul. 21, 2005

Related U.S. Application Data

(63) Continuation of application No. PCT/US03/16629, filed on May 27, 2003.

(60) Provisional application No. 60/382,608, filed on May 24, 2002, provisional application No. 60/382,609, filed on May 24, 2002, provisional application No. 60/382,610, filed on May 24, 2002.

(51) Int. Cl.  
*H02K 1/00* (2006.01)

(52) U.S. Cl. .................. 310/187; 310/172; 310/261

(58) Field of Classification Search ................. 310/187, 310/172, 269, 264, 261, 166, 168, 193  
See application file for complete search history.

(56) References Cited

U.S. PATENT DOCUMENTS

| | | | | |
|---|---|---|---|---|
| 3,634,707 A | * | 1/1972 | Tillner et al. ................. | 310/172 |
| 3,873,897 A | * | 3/1975 | Muller ......................... | 318/138 |
| 3,956,678 A | * | 5/1976 | Byrne et al. ................. | 318/138 |
| 4,573,003 A | * | 2/1986 | Lipo ........................... | 318/722 |
| 4,698,537 A |   | 10/1987 | Byrne et al. | |
| 4,730,136 A | * | 3/1988 | Muller ...................... | 310/68 R |
| 4,734,603 A | * | 3/1988 | von der Heide et al. ....... | 310/72 |
| 5,146,127 A | * | 9/1992 | Smith .......................... | 310/166 |
| 5,256,923 A | * | 10/1993 | Bartos et al. ................. | 310/166 |
| 5,672,925 A | * | 9/1997 | Lipo et al. ............. | 310/154.11 |
| 5,747,912 A | * | 5/1998 | Sakuma et al. ............... | 310/261 |
| 5,747,962 A |   | 5/1998 | Fulton | |
| 5,844,343 A |   | 12/1998 | Horst | |
| 5,917,263 A | * | 6/1999 | Sakuma et al. ............... | 310/261 |
| 6,005,321 A |   | 12/1999 | Bolton et al. | |
| 6,028,385 A |   | 2/2000 | Pengov et al. | |
| 6,046,568 A |   | 4/2000 | Pengov | |
| 6,052,903 A |   | 4/2000 | Metcalf et al. | |
| 6,351,053 B1 | * | 2/2002 | Minoshima et al. ......... | 310/216 |
| 6,441,529 B1 | * | 8/2002 | Mimura et al. ............... | 310/216 |
| 6,483,212 B1 | * | 11/2002 | Mimura et al. ............ | 310/68 R |
| 6,815,859 B2 | * | 11/2004 | Sakuma et al. ......... | 310/156.53 |

* cited by examiner

*Primary Examiner*—Dang D Le

(57) ABSTRACT

A two-phase switched reluctance motor in an embodiment includes a plurality of salient rotor poles that each have asymmetric reluctances about a central radial axis of the respective rotor pole. Each of the rotor poles has the same width, and the rotor poles are operable to provide preferential torque generation in one direction of rotation for all rotor positions. Such preferential torque generation occurs under the influence of an electromagnetic flux, which is provided by a plurality of salient stator poles having substantially the same width as the rotor poles.

15 Claims, 40 Drawing Sheets

PMBDCM AND TWO PHASE SRM MOTOR, TWO PHASE SRM ROTOR AND STATOR, AND COIL WRAP FOR PMBDCM AND SRM MOTORS

This is a continuation of PCT International application Ser. No. PCT/US03/16629 filed May 27, 2003, which is based on provisional application Ser. Nos. 60/382,608, 60/382,609 and 60/382,610 all filed on May 24, 2002.

CROSS-REFERENCE TO RELATED APPLICATIONS

This application claims priority to U.S. Provisional Application Nos. 60/382,608, 60/382,609, and 60/382,610 filed May 24, 2002. Additionally, the application hereby incorporates by reference the disclosures provided in Applicant's co-pending PCT International Applications, having filed on the same date herewith.

BACKGROUND OF THE INVENTION

1. Field of the Invention

The invention relates to multiple-phase switched reluctance machines (SRMs) and, more specifically, to two-phase self-starting. SRMs. Additionally, the invention relates to SRMs and permanent magnet brushless direct current (dc) machines (PMBDCMs) and, more specifically, to reducing vibration and acoustical noise in SRMs and PMBDCMs.

2. Description of Related Art

Related art two-phase switched reluctance machines (TPSRMs) do not produce electromagnetic torque at certain rotor positions, i.e., when the rotor poles are midway between the stator poles. At such rotor positions, the electromagnetic torque that can be produced is zero for both phases. Therefore, exciting one or both phase windings does not help in moving the rotor from its stand-still position. Because of this, these machines are not self-starting from stand-still. This particular problem of zero torque does not arise in the case of SRMs with more than two phase windings.

The natural question that arises is why not use SRMs having three or more phases and completely do away with two-phase machines. The answer lies in the fact that the TPSRM requires fewer power devices, such as controllable power switches and power diodes, in its power converter as compared to machines with three or more phases. Using fewer power devices in the power converter lends itself to a large saving in power converter cost. This cost saving in the power converter leads to a greater cost reduction of the total motor drive system.

Moreover, a reduction in the number of power devices provides additional benefits. For example, a power converter using fewer devices can employ a smaller heat sink for the thermal management of the power devices, fewer gate drive circuits, fewer gating power supplies, and fewer components in the drive circuits and gating power supplies. Additionally, such a power converter can employ fewer pulse width modulation (PWM) channels, due to the reduction of power devices, and has a lower control burden, as only two phases have to be controlled as opposed to three or more phases. All of these factors contribute to reducing the number of components and simplifying the microcontroller that is used to control the power converter, resulting in a large reduction in cost of the motor drive system. The principle and operation of the SRM is explained in many publications and in the book "Switched Reluctance Motor Drives," R. Krishnan, CRC Press, June 2001, which is hereby incorporated by reference. For brevity, all of this description will not be provided herein, but may be obtained by reference to the identified book.

FIG. 1 illustrates a related art TPSRM. TPSRM 100 has a stator 101 with four salient stator poles 102 and a rotor 103 with six salient rotor poles 104. Rotor 103 is mounted on a shaft 105 for rotation within stator 101, about the axis of shaft 105. Stator poles 102 are wound with concentric stator windings 106-109. The stator windings 106, 107 and 108, 109, respectively, on the diametrically opposite stator poles 102 are connected usually in series, though sometimes in parallel, and the two serially connected coils constitute a phase winding, commonly referred to as stator phase. Therefore, a four-pole stator 101 will have two phase windings or two stator phases.

A rotor normally has two poles in a TPSRM. For this description, though, TPSRM 100 has a six-pole rotor 103. This combination is referred to as a 4/6 machine, the first number denoting the number of stator poles 102 and the second number denoting the number of rotor poles 104.

FIG. 2 illustrates a graph of the flux linkages for the TPSRM illustrated by FIG. 1 plotted as a function of rotor position, using a fixed stator excitation in the phase windings. FIG. 3 illustrates a graph of the electromagnetic torque for the TPSRM illustrated by FIG. 1 plotted as a function of its rotor position, using a fixed stator excitation in the phase windings. The flux linkages are defined as the product of lines of flux that link the number of winding turns in a phase winding and have been computed here using a two-dimensional finite element analysis method. The electromagnetic torque is the torque generated in the air gap of the machine, due to the flux and current in the machine, and is computed from the flux linkages versus rotor position characteristic for a given excitation current in the phase windings.

Because of the symmetry of rotor poles 104 with respect to a set of stator poles 102, flux linkages 201 and 202 and, hence, torque characteristics 301 and 302 are symmetric, resulting in instances where torques 301 and 302 are simultaneously zero for both phases. These instances of zero torque make it difficult to start TPSRM 100, if the stand-still or start-up rotor positions correspond to them. Therefore, TPSRM 100 is inherently incapable of self-starting in both directions of rotation, if provision is not made to eliminate these simultaneous zero-torque instances.

Two-phase SRMs have been in research since 1969. Most of these TPSRMs have four stator poles and two rotor poles. In order to have any directional starting capability, these machines have had their rotor poles shaped. Such rotor pole shaping is described by Byrne et al., in U.S. Pat. No. 3,956,678.

Byrne discloses rotor pole shaping taking the form of a very extended pole arc, exceeding 100 degrees, which is unusual for an SRM and is denoted in literature as an arcuate pole. Byrne also discloses populating half of the distal end portion of the rotor poles with trapezoidal slots, for the purpose of producing a flux that is linear with angular position. This feature makes the slope of the flux with respect to the rotor position a constant, resulting in constant torque. When the slotted portion of the rotor is in alignment with the stator pole, only half the flux flows as compared to a case where the unslotted portion of the rotor is aligned with the stator pole. This is the reason why the rotor pole has an arc of greater than 100 degrees.

U.S. Pat. Nos. 5,747,962, 5,844,343, and 6,005,321 disclose another approach to providing TPSRMs with a self-starting capability. This approach is to have rotor poles with two steps, known as stepped rotor pole faces, so that the low or high air gap part of the rotor pole pair is close to one or the other phase's stator poles. This ensures that there is a reluctance variation available for producing electromagnetic torque. The disadvantage of such an approach is that wider rotor poles are employed, giving way to low torque density and a nonlinear relationship between the flux and rotor position. Due to the nonlinear relationship between the flux and rotor position, the TPSRM has a large torque ripple and a varying torque constant, thus making control of the machine difficult.

U.S. Pat. No. 4,698,537 discloses another way to create overlapping torque in TPSRMs, which involves using pole shoes. The pole shoes provide a path for fringing flux, when both phases are excited simultaneously. The fringing flux produces starting torque when the rotor poles are completely aligned with a set of stator poles. This may be viewed as the torque due to mutual flux linkages. The pole shoes accentuate the mutual flux linkages, since the pole shoes overarch a set of stator poles and come close to the other set of poles in terms of their reach, thus facilitating a mutual coupling through a flux path. The rotor slotting is used here to provide the linear flux to rotor position relationship and not for augmenting the starting torque. Also, this technique is intended for machines having a two-to-one ratio between stator and rotor poles.

U.S. Pat. Nos. 5,747,962, 5,844,343, and 6,005,321 also disclose various other approaches for providing a self-starting capability, using a stepped air-gap rotor with two- or even three-phase SRMs. The second and third stator windings are called auxiliary windings. They are mainly used to augment the regular torque, or used in starting.

U.S. Pat. No. 5,747,962 discloses that a simultaneous excitation of the two phases produces enhanced torque, both at starting and running. A control system to achieve the simultaneous excitation is presented, though this control system does not provide current profiling due to its perceived complexity.

U.S. Pat. No. 5,844,343 discloses that an auxiliary winding is selectively utilized for starting or augmenting the torque. Stator pole shifting is also used for starting purposes.

U.S. Pat. No. 6,005,321 discloses that two auxiliary windings are used to generate the starting torque. In all these approaches, three or more controllable switches are needed to realize variable speed operation of the SRM. Moreover, these stepped air gap approaches do not significantly alter the requirements of a regular two-phase SRM.

U.S. Pat. No. 6,028,385 discloses another approach whereby the SRM has eight stator poles and four rotor poles, and one pair of rotor poles is wider than the other. This configuration provides non-zero torque at every possible rotor position, when both phases are used to generate torque. This approach seems to exploit the earlier approaches of wider rotor poles, but only for one set of rotor poles rather than for all the rotor poles.

U.S. Pat. Nos. 6,046,568 and 6,051,903, issued to Pengov, disclose similar approaches whereby one set of rotor poles is wider than the other set. Pengov discloses configurations whereby both pole sets align with respective stator poles of a first phase, while at the same time the wider rotor pole set communicates with the stator poles of a second phase. These configurations provide a favorable torque generation aspect to the next or successive phase. The concept has been extended to three- and four-phase SRMs. The disadvantage of this approach is that one set of rotor poles has to be twice or more as wide as the other set of rotor poles, resulting in high rotor iron volume and weight. Thus, these approaches reduce the power density of the machine. Furthermore, these approaches complicate the control system, due to the many different modes that exist in the fluxing of the machine phases.

Some of the above described related art approaches to providing a self-starting TPSRM have an unevenness in the mechanical structure of the rotor, resulting in a non-uniform air gap when the stator and rotor poles align. These approaches are prone to normally-induced forces and, hence, may have a slightly higher acoustic noise. This is yet to be proved, but can be inferred from the electromagnetic structure and the slope of the inductance curves of the machines. Therefore, a better and improved method of producing an electromagnetic torque at all rotor positions is desirable.

All reference material cited herein is hereby incorporated into this disclosure by reference.

SUMMARY OF THE INVENTION

The present invention overcomes the zero-torque rotor position-instance, for the combined two phases of the machine. Because the torque at any instant is nonzero, in one or the other phase, this machine can be started in any direction of rotation from stand-still. Since it can be started from any direction, it can also be run in any direction as a motor. Likewise, it can be run as a generator in any direction, thus giving a four-quadrant operation in a torque-versus-speed characteristic of the machine. In combination with any one of the power converter topologies that are currently available, a variable speed motor drive system can be realized with the present invention.

Embodiments of the invention are broadly classified into the following categories:

(i) Stator and or rotor pole shaping. The stator and rotor poles are contoured such that the effective air gap between the aligned stator and rotor poles has a monotonically increasing or decreasing length. The contouring may not be symmetric for all poles, in that the order of contouring may be interchanged for successive rotor pole pairs.

(ii) Rotor pole slotting. The rotor poles are slotted to provide a non-uniform air gap and reluctance, so that an overlap occurs in the electromagnetic characteristics of the two phases. This feature prevents a zero-torque instance from occurring simultaneously for both phases.

(iii) Stator or rotor pole phase shifting. Phase shifting also prevents a zero-torque instance from simultaneously occurring for both phases.

(iv) Vibrations and acoustic noise and reduction in SRMs. Noise reduction may be accomplished by judicious placement of stator poles and shaping of the SRM's back iron. Additionally, to reduce the acoustic noise and vibration induced by normal forces, structures for holding the SRM coils in place may be used.

Together, the disclosed features make possible a high performance TPSRM.

Therefore, an object of the present invention is to overcome the shortcomings and problems encountered in related art devices.

Another object of the invention is to provide a self-starting capability for a TPSRM.

Still another object of the invention is to provide a self-starting capability for a TPSRM without using stepped air gap rotor poles.

A further object of the invention is to provide a self-starting capability for a TPSRM without using rotor poles of various widths.

A further object of the invention is to provide a TPSRM having a low torque ripple, while reducing the rotor iron weight and volume.

A further object of the invention is to provide all of the above features while using a stator having only four stator poles.

A further object of the invention is to provide a TPSRM having rotor poles with the same width.

A further object of the invention is to provide a TPSRM capable of self-starting and providing the desired torque at all operating speeds.

A further object of the invention is to provide the above features using stator pole shaping, rotor pole shaping, or phase shifting of the rotor poles.

A further object of the invention is to shape the rotor or stator poles by contouring or slotting.

A further object of the invention is to reduce the acoustic noise produced by the TPSRM, by placing its stator poles in corners of the stator laminations.

A further object of the invention is to reduce vibration and improve reliability of the TPSRM by tying stator windings of the TPSRM to the stator iron, with a tie-wrap that is inserted from the base of the windings, tightened, and welded to secure the windings against acceleration.

A further object of the invention is to place windings of the TPSRM flat against a smooth-faced inner periphery of the TPSRM's stator back iron, thus enabling a tight binding of the coil to resist vibrations, induced by the normal forces, and reduce acoustic noise.

The objects of the present invention may be achieved in whole or in part by a rotor, for a two-phase switched reluctance motor, having a plurality of salient rotor poles that each have asymmetric reluctances about a central radial axis of the respective rotor pole. Each of the rotor poles has the same width, and the rotor poles are operable to provide preferential torque generation in one direction of rotation for all rotor positions. Such preferential torque generation occurs under the influence of an electromagnetic flux, which is provided by a plurality of salient stator poles having widths that are not too much smaller than those of the rotor poles.

The objects of the present invention may be further achieved in whole or in part by a two-phase switched reluctance motor having a stator with a plurality of salient stator poles that are operable to convey an electromagnetic flux. Additionally, the motor has a rotor with a plurality of salient rotor poles that are contoured or slotted to provide preferential torque generation, in one direction of rotation, for all rotor positions when receiving the electromagnetic flux. Here too, the stator and rotor poles have widths that are not too unequal, such as having a ratio of stator to rotor pole widths of 0.5.

The objects of the present invention may be further achieved in whole or in part by a two-phase switched reluctance motor having a stator with four salient stator poles, which are operable to convey an electromagnetic flux, and a rotor with six salient rotor poles that are contoured or slotted to provide preferential torque generation, in one direction of rotation, for all rotor positions when receiving the electromagnetic flux. The four stator poles have equal widths and the four rotor poles have equal widths, but the rotor and stator pole widths may be slightly different.

The objects of the present invention may be further achieved in whole or in part by a two-phase switched reluctance motor having a rotor with a plurality of salient rotor poles that are operable to rotate in accordance with an electromagnetic flux. A stator of the motor has a plurality of salient stator poles that are contoured to provide preferential torque generation, in one direction of rotor rotation, for all rotor positions when conveying the electromagnetic flux.

The objects of the present invention may be further achieved in whole or in part by a two-phase switched reluctance motor or permanent magnet brushless direct current motor having stator laminations that define four inner corners. Additionally, the motor includes a stator with four salient stator poles that are each positioned in a separate inner corner of the stator laminations.

BRIEF DESCRIPTION OF THE DRAWINGS

Preferred embodiments of the present invention will now be further described in the following paragraphs of the specification and may be better understood when read in conjunction with the attached drawings, in which.

DETAILED DESCRIPTION OF THE INVENTION

A first embodiment of the invention is drawn toward providing an electromagnetic torque for all rotor positions of a two-phase switched reluctance machine (TPSRM), without affecting the uniform air gap between the stator and rotor poles during their alignment and without increasing the rotor pole arc. Instead, an equivalent phase displacement of flux linkages can be achieved by providing a slot (i.e., hole) in the rotor poles. The slot can have a variety of shapes.

Figure 1:
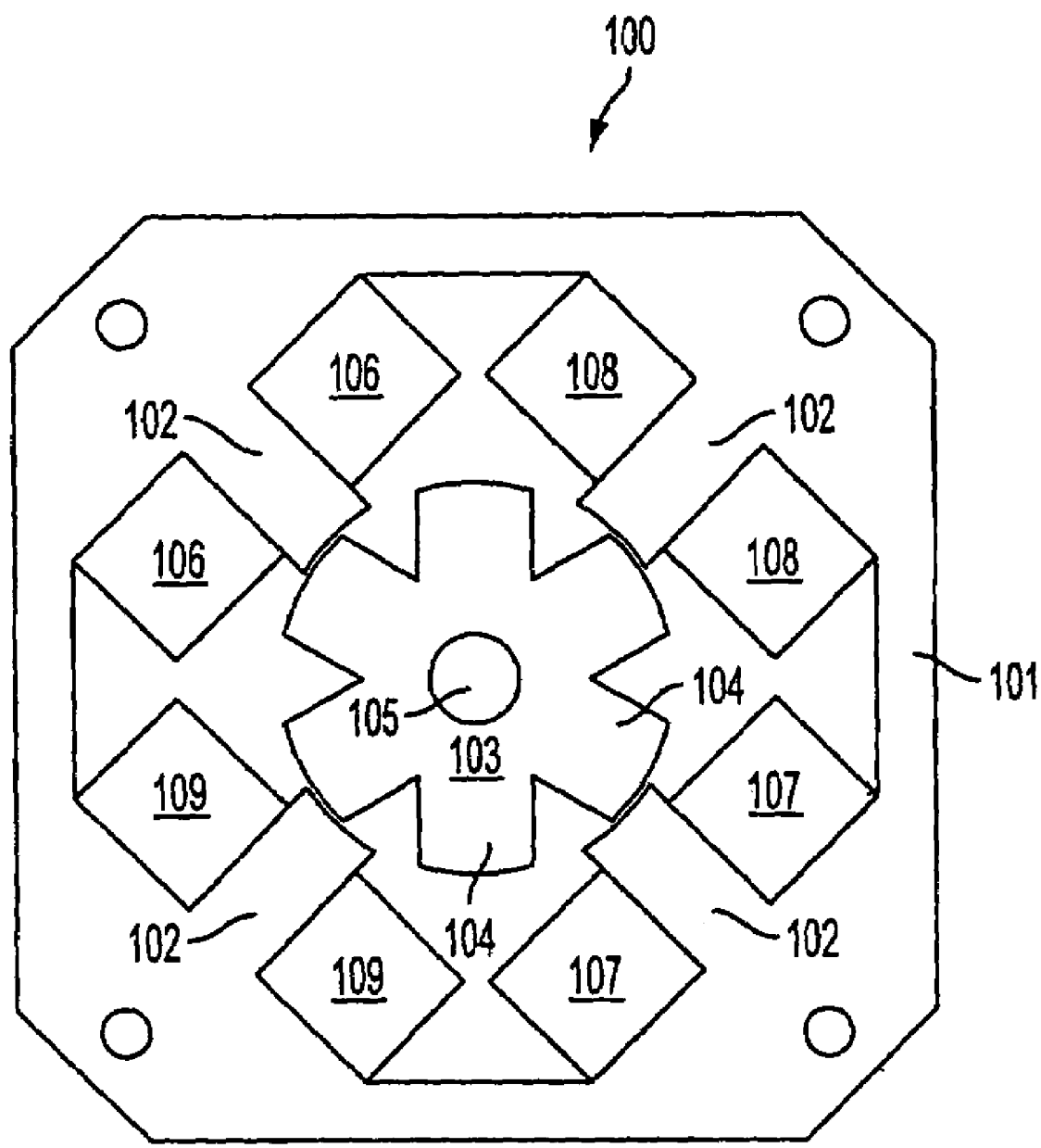
FIG. 1 illustrates a related art TPSRM.
Figure 2:
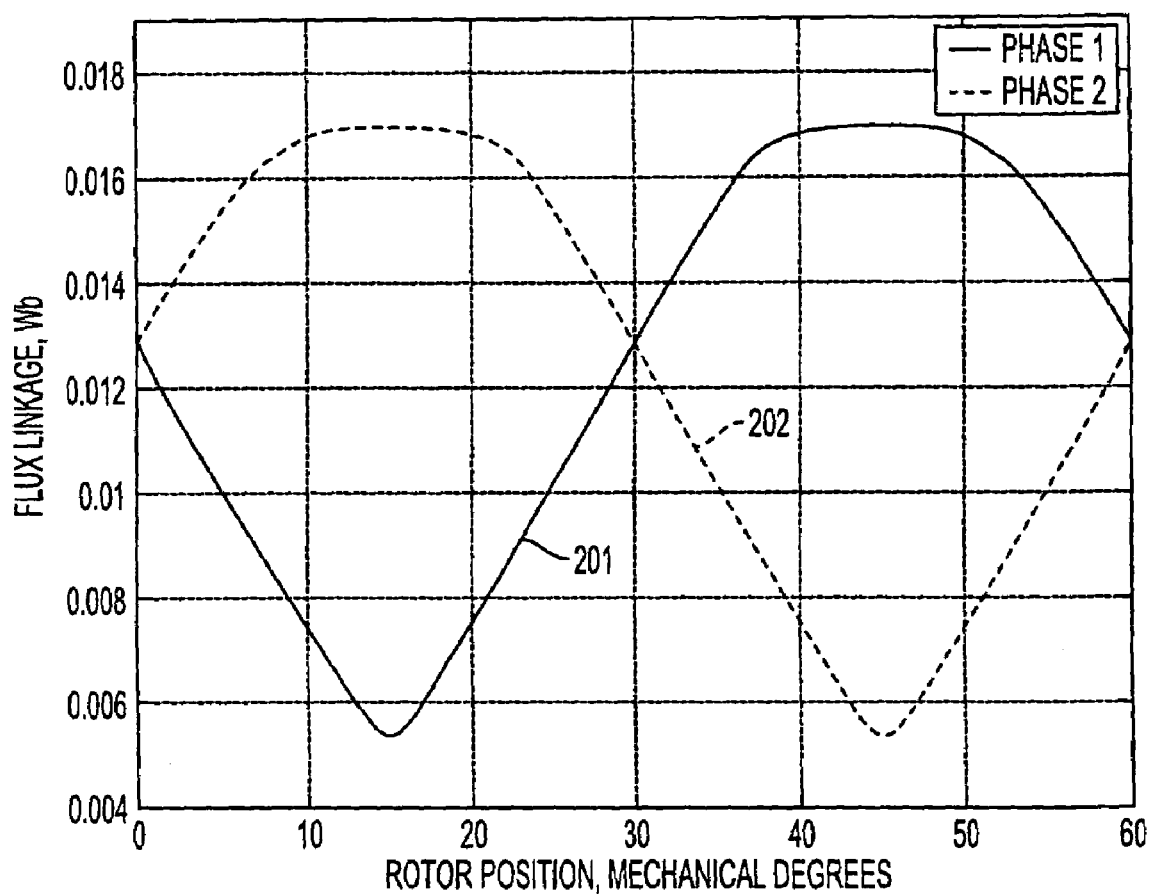
FIG. 2 illustrates a graph of the flux linkages for the TPSRM illustrated by FIG. 1 plotted as a function of rotor position, using a fixed stator excitation in the phase windings.
Figure 3:
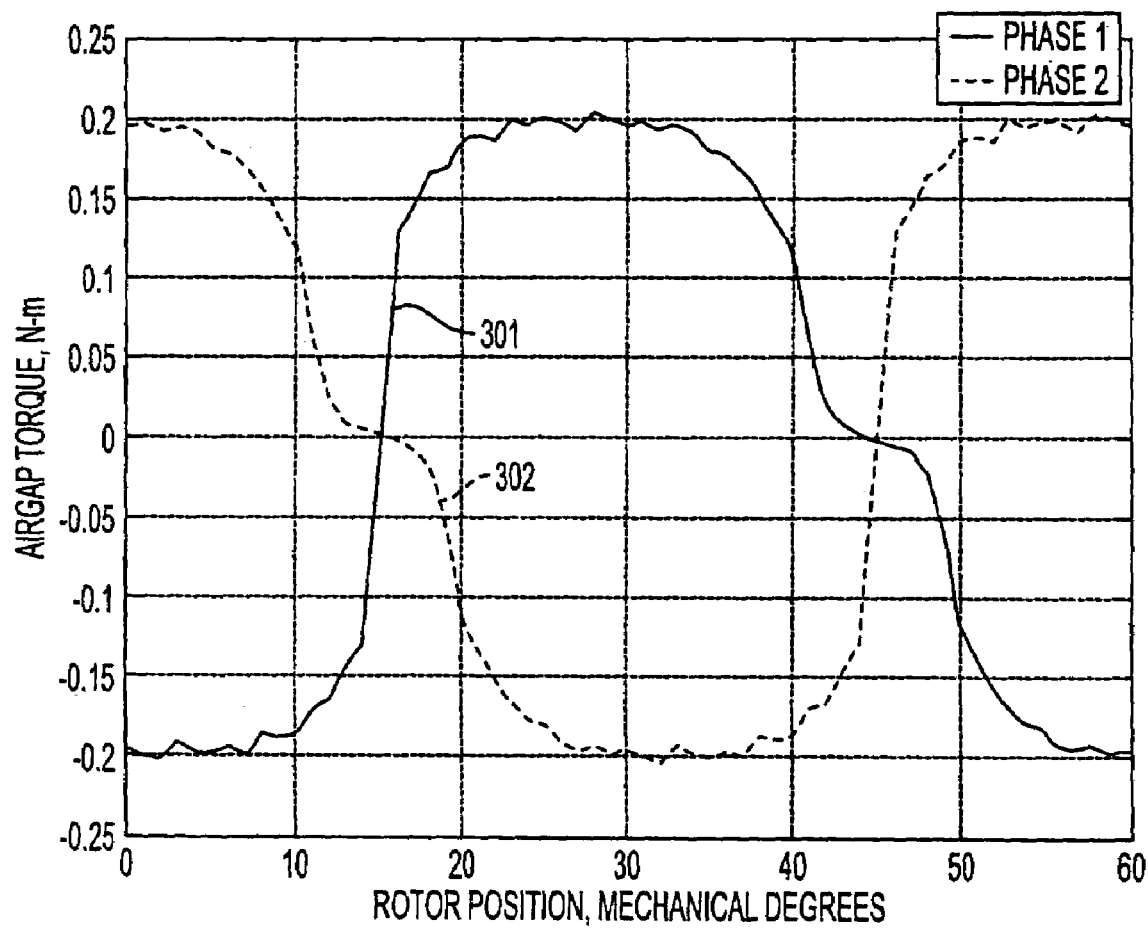
FIG. 3 illustrates a graph of the electromagnetic torque for the TPSRM illustrated by FIG. 1 plotted as a function of its rotor position, using a fixed stator excitation in the phase windings.
Figure 4:
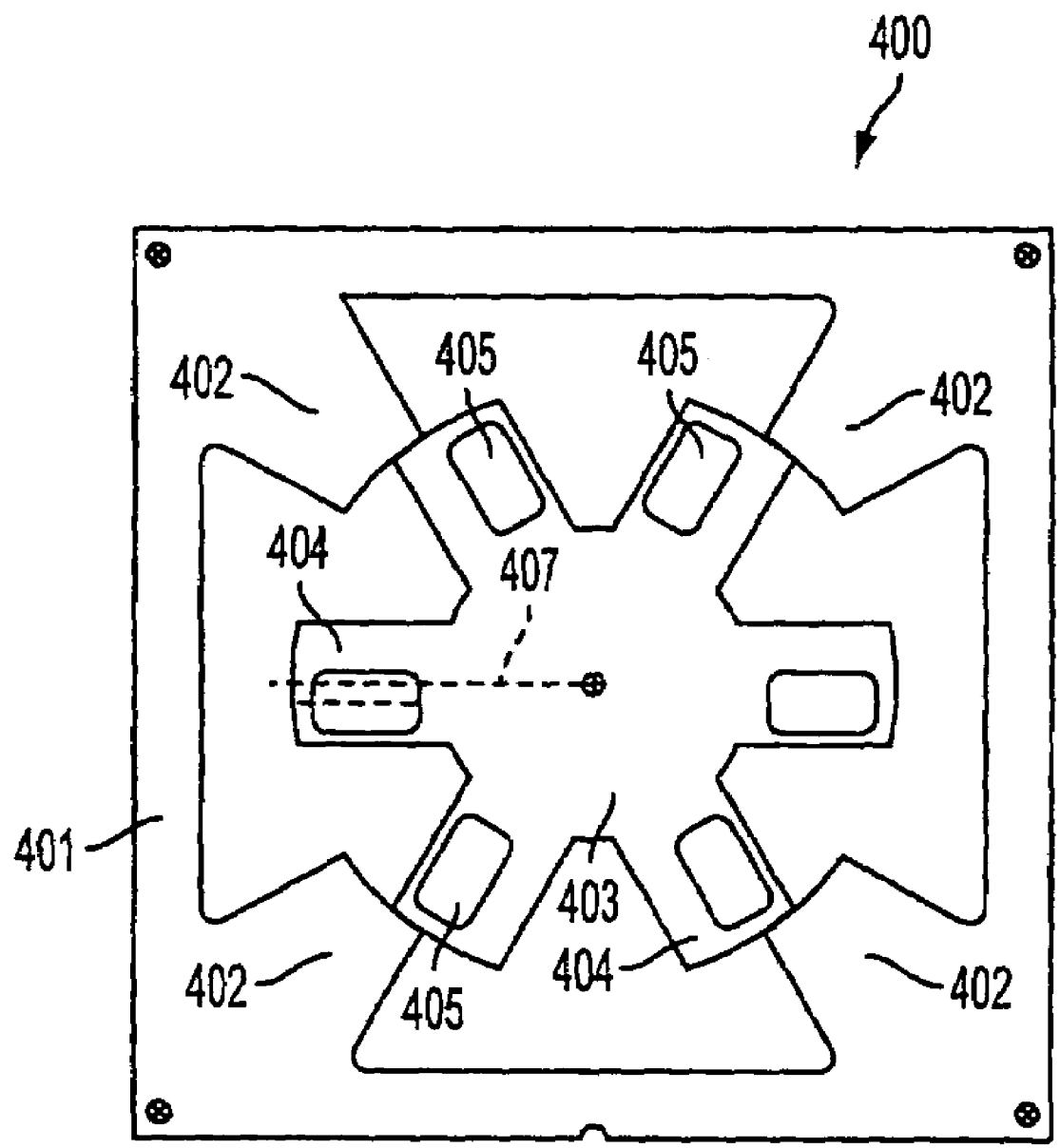
FIG. 4 illustrates a TPSRM having off-center slots in its rotor poles.

FIG. 4 illustrates a TPSRM having off-center slots in its rotor poles. A TPSRM 400 has a stator 401 with four salient stator poles 402 and a rotor 403 with six salient rotor poles 404. Each rotor pole 404 has a rotor pole slot 405 that is offset from a central radial axis 407 of the respective rotor pole 404 to provide a preferred path for the flux to flow between stator 401 and rotor 403. Making the rotor pole slot axis uneven toward one side reduces the flow of flux on that side by increasing the air gap reluctance. The flux on the other side is increased, due to the greater amount of iron it has and the reduced net air gap faced by the flux path. As a result, offset rotor pole slots 405 tend to provide a preferential starting direction for rotor 403.

Adjacent rotor poles 404 have an opposite or mirror image symmetry for the offset rotor pole slots 405. In other words, the slot axis of one rotor pole is made closer to its right side while the adjacent rotor pole will have the slot axis towards its left side. This provides the necessary high rate of change of flux linkages, one in the counter clockwise direction and a subsequent one in the clockwise direction. The high rate of flux linkage change provides higher torque in a particular direction and, hence, rotation in this direction.

Offset rotor pole slot 405 provides a beneficial effect not only on the torque generated at all rotor positions, and for both rotational directions of running, it also removes some amount of iron from the rotor poles. Removing the iron results in a lighter rotor and, hence, lower rotor inertia. This is advantageous in high performance applications where the torque-to-inertia ratio, which is also the acceleration of the machine, has to be maximized to reduce the process cycle times. It may also have applications in aerospace, where low weight is of prime concern and choice.

Many choices of rotor pole slotting are shown in the drawings. They all have the same effect of providing the unequal resultant effective air gap, when the stator poles align with the rotor poles. Therefore, each of these illustrated choices-provides a directional torque-producing capability for starting the TPSRM in both directions.

Figure 5:
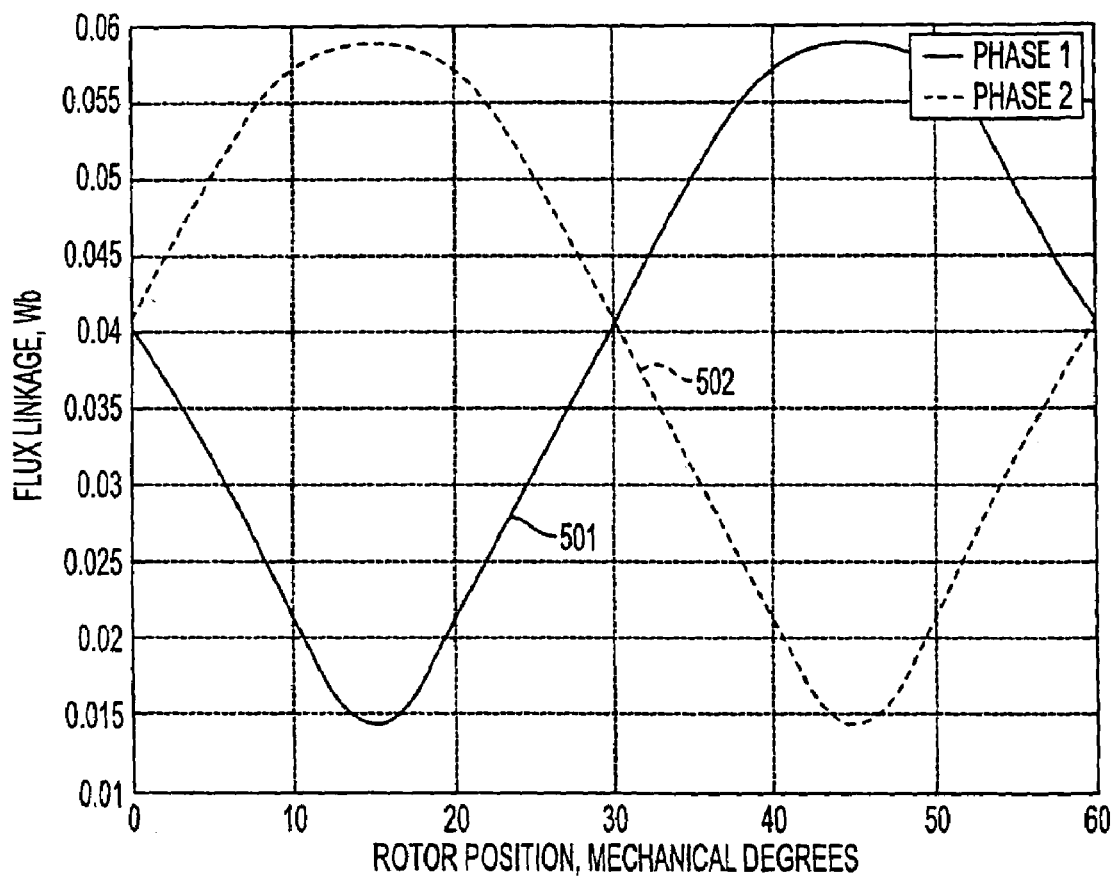
FIG. 5 illustrates a graph of the flux linkages for the TPSRM illustrated by FIG. 4 plotted as a function of rotor position, using a fixed stator excitation in the phase windings.
Figure 6:
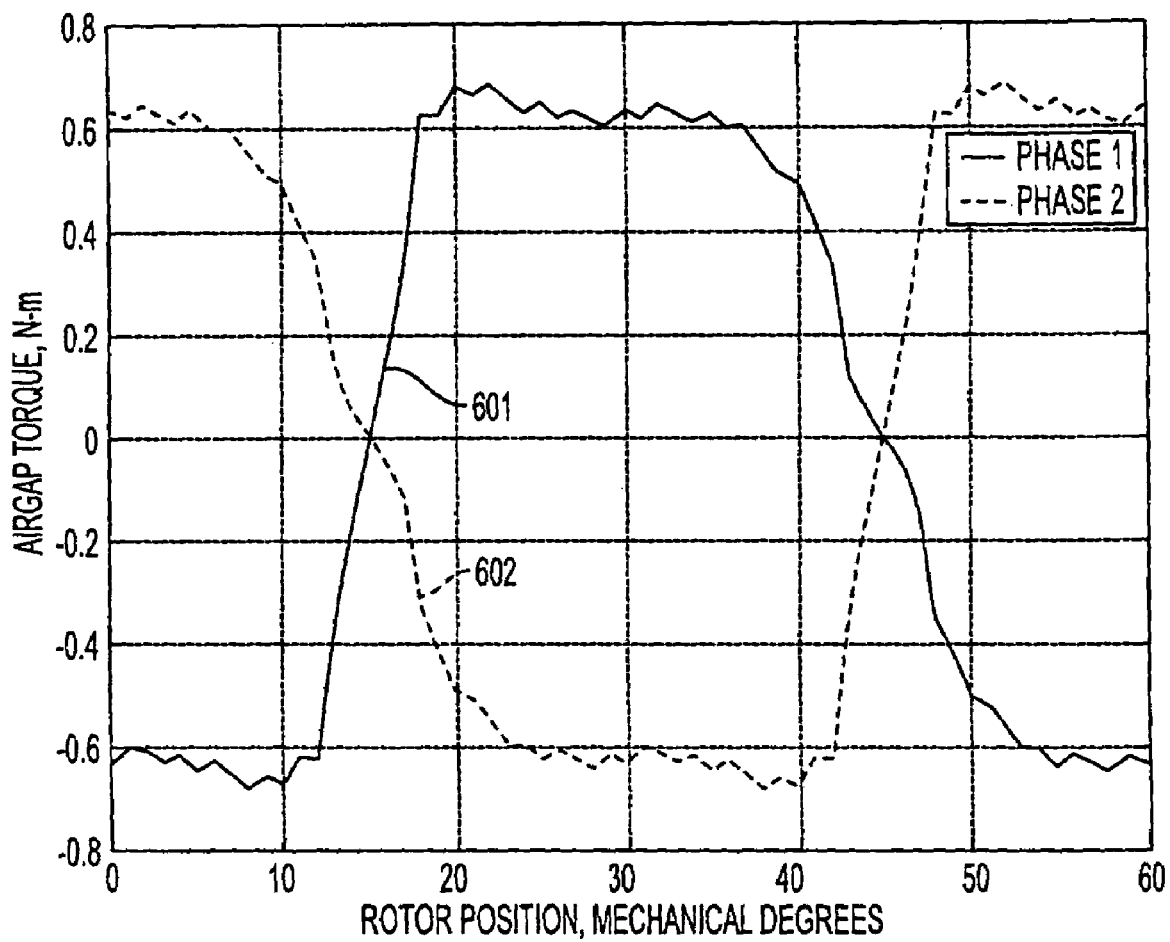
FIG. 6 illustrates a graph of the electromagnetic torque for the TPSRM illustrated by FIG. 4 plotted as a function of its rotor position, using a fixed stator excitation in the phase windings.

FIG. 5 illustrates a graph of the flux linkages for the TPSRM illustrated by FIG. 4 plotted as a function of rotor position, using a fixed stator excitation in the phase windings. FIG. 6 illustrates a graph of the electromagnetic torque for the TPSRM illustrated by FIG. 4 plotted as a function of its rotor position, using a fixed stator excitation in the phase windings. As may be seen by inspection of the phase 1 and 2 flux linkages 501 and 502, respectively, in FIG. 5 and by the phase 1 and 2 torques 601 and 602, respectively, in FIG. 6, TPSRM 400 does not produce the requisite phase shift for nonzero torque production. This is because there is no real asymmetry in the rotor structure of the machine. If the leading edge of the rotor pole has a slot, then so too does the trailing edge of the diametrically opposed rotor pole. Therefore, the flux path asymmetry of one rotor pole is cancelled by the flux path asymmetry of the diametrically opposed rotor pole. From FIG. 5, it may be seen that the maximum phase 1 flux linkage and the minimum phase 2 flux linkage occur at the same time, thereby making their combined torque on the rotor zero, as evidenced by the torque characteristic shown in FIG. 6.

Figure 7:
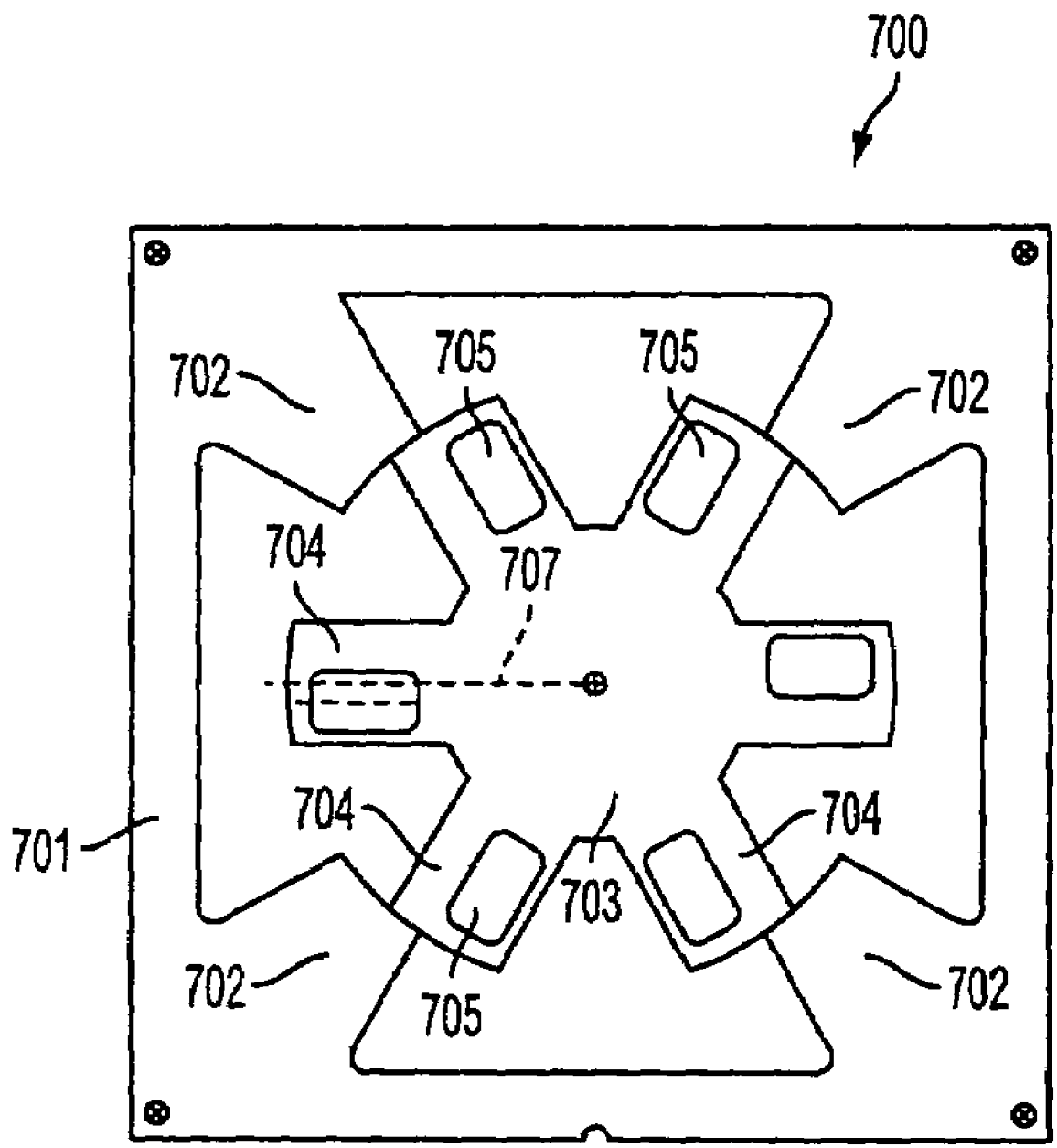
FIG. 7 illustrates an asymmetric arrangement of rotor pole slots on diametrically opposite rotor poles.

FIG. 7 illustrates an asymmetric arrangement of rotor pole slots on diametrically opposite rotor poles. A TPSRM 700 has a stator 701 with four salient stator poles 702 and a rotor 703 with six salient rotor poles 704. Each rotor pole 704 has a rotor pole slot 705 that is offset from a central radial axis 707 of the respective rotor pole to provide a preferred path for the flux to flow between stator 701 and rotor 703. Making the rotor pole slot axis uneven toward one side reduces the flow of flux on that side, by increasing the air gap reluctance. The flux on the other side is increased, due to the greater amount of iron it has and the reduced net air gap faced by the flux path. As a result, offset rotor pole slots 705 tend to provide a preferential starting direction for rotor 703.

Rotor poles 704, which are positioned diametrically opposite one another on rotor 703, have an opposite or mirror image symmetry about a central radial line passing through the pair of opposing rotor poles. Stated another way, each of rotor poles 704 forming the rotor pole pair has the same symmetry about its respective central radial axis. Four of the six adjacent pairs of rotor poles 704 also have an opposite or mirror image symmetry about their respective central radial axes. For illustration, the rotor pole slots are somewhat exaggerated in FIG. 7.

Figure 8:
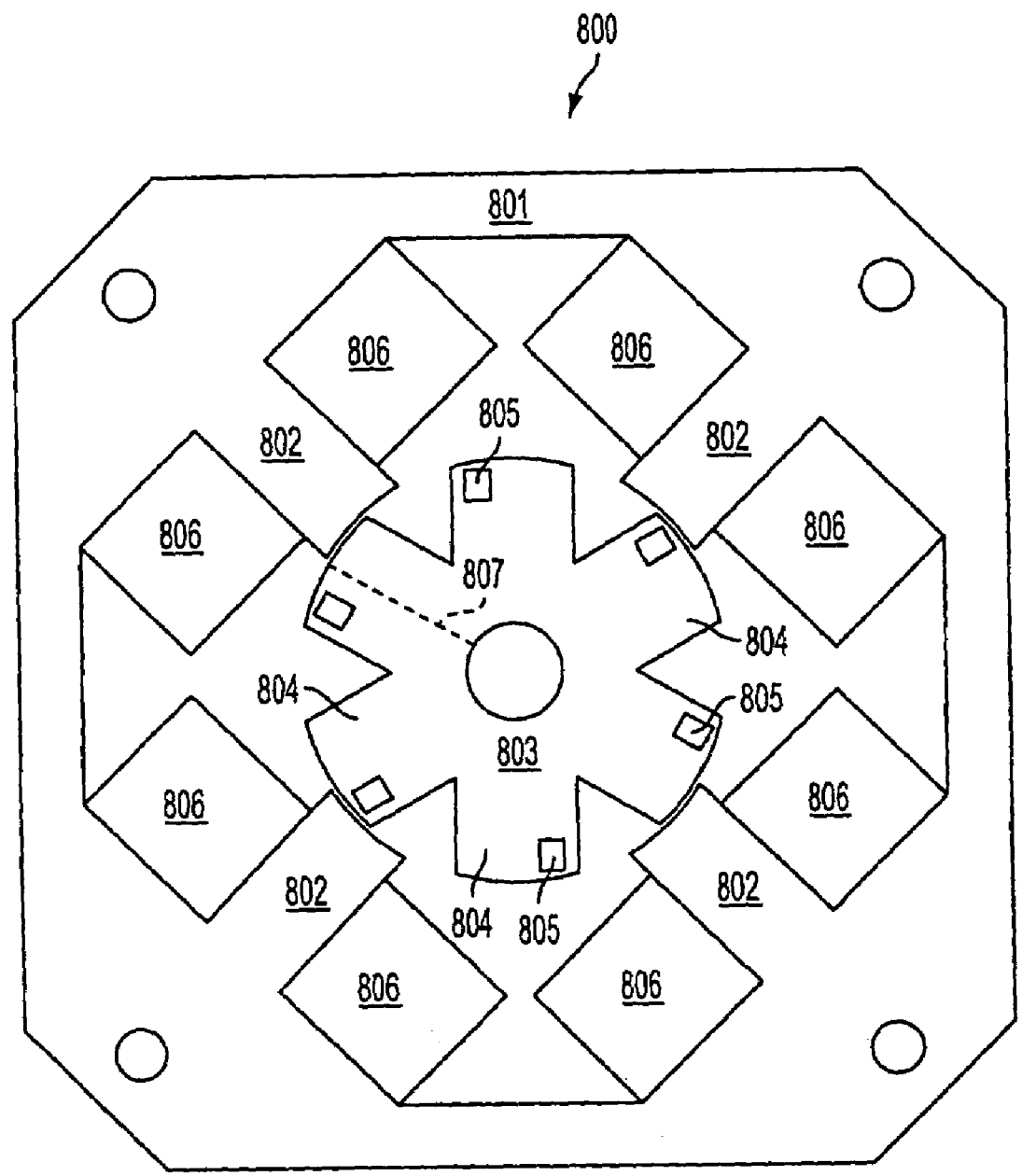
FIG. 8 illustrates another asymmetric arrangement of rotor pole slots on diametrically opposite rotor poles.

FIG. 8 illustrates another asymmetric arrangement of rotor pole slots on diametrically opposite rotor poles. A TPSRM 800 has a stator 801 with four salient stator poles 802 and a rotor 803 with six salient rotor poles 804. Each stator pole 802 has stator windings 806 wound concentrically around it. Each rotor pole 804 has a rotor pole slot 805 that is offset from a central radial axis 807, of the respective rotor pole, to provide a preferred path for the flux to flow between stator 801 and rotor 803.

Rotor poles 804, which are positioned diametrically opposite one another on rotor 803, have an opposite or mirror image symmetry about a central radial line passing through the pair of opposing rotor poles. Stated another way, each of rotor poles 804 forming the rotor pole pair has the same symmetry about its respective central radial axis. TPSRM 800 differs from TPSRM 700 in that none of the six adjacent pairs of rotor poles 804 have an opposite or mirror image symmetry about their respective central radial axes. Instead, all of the adjacent pairs of rotor poles 804 have the same symmetry about their respective central radial axes 807. Also, TPSRM 800's rotor pole slots 805 have been more realistically illustrated in proportion to the size of their respective rotor poles 804.

The rotor iron pole area may be at least equal or slightly lower than the stator pole area, and the rotor pole slots usually have an area much smaller (e.g., <35%) than the active rotor iron area for flux flow. This is the usual design, though these features may be varied to suit a particular application. The reluctance provided by the rotor circuit is high when rotor 803 is rotated in the clockwise direction, until the slotted portion passes stator poles 802. When the non-slotted portion (i.e., the iron region) passes stator poles 802, the reluctance is minimal. The unevenness in the reluctance is generated by this arrangement.

Figure 9:
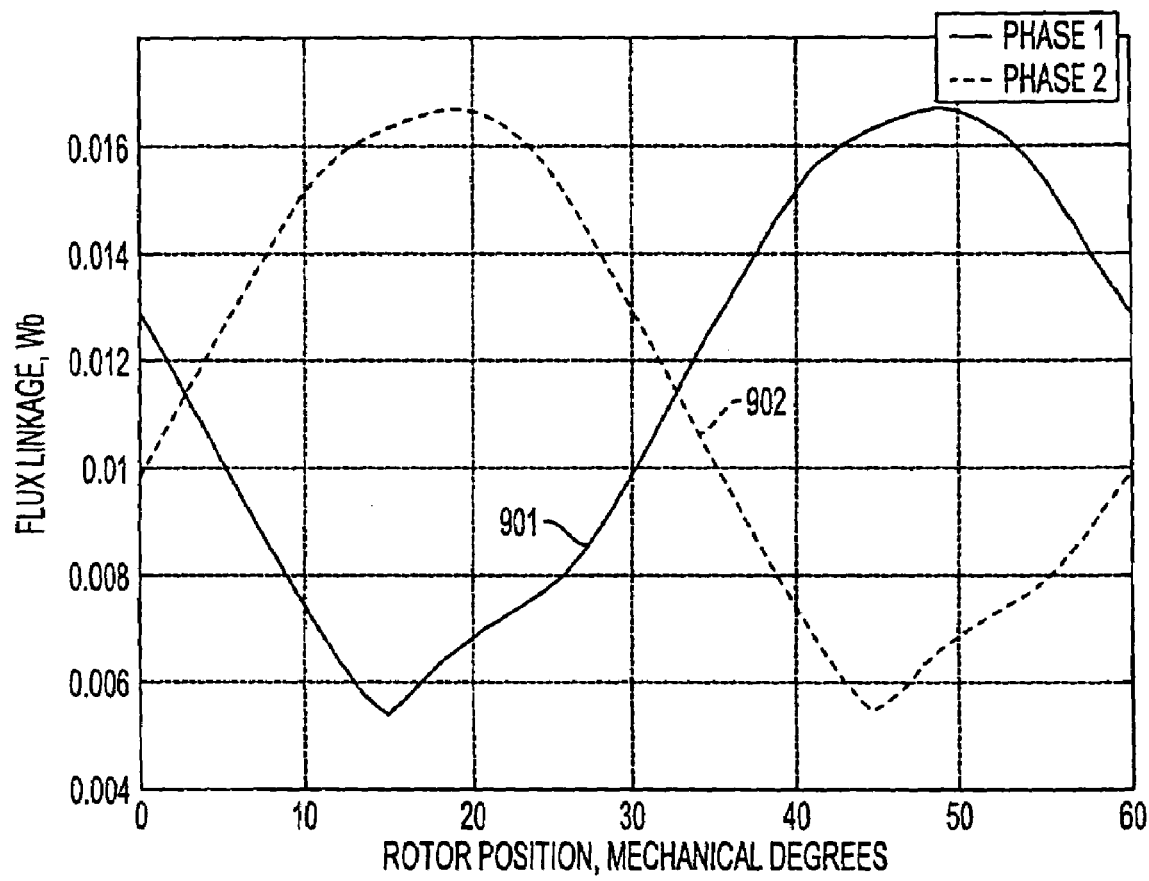
FIG. 9 illustrates a graph of the flux linkages for the TPSRM illustrated by FIG. 8 plotted as a function of rotor position, using a fixed stator excitation in the phase windings.
Figure 10:
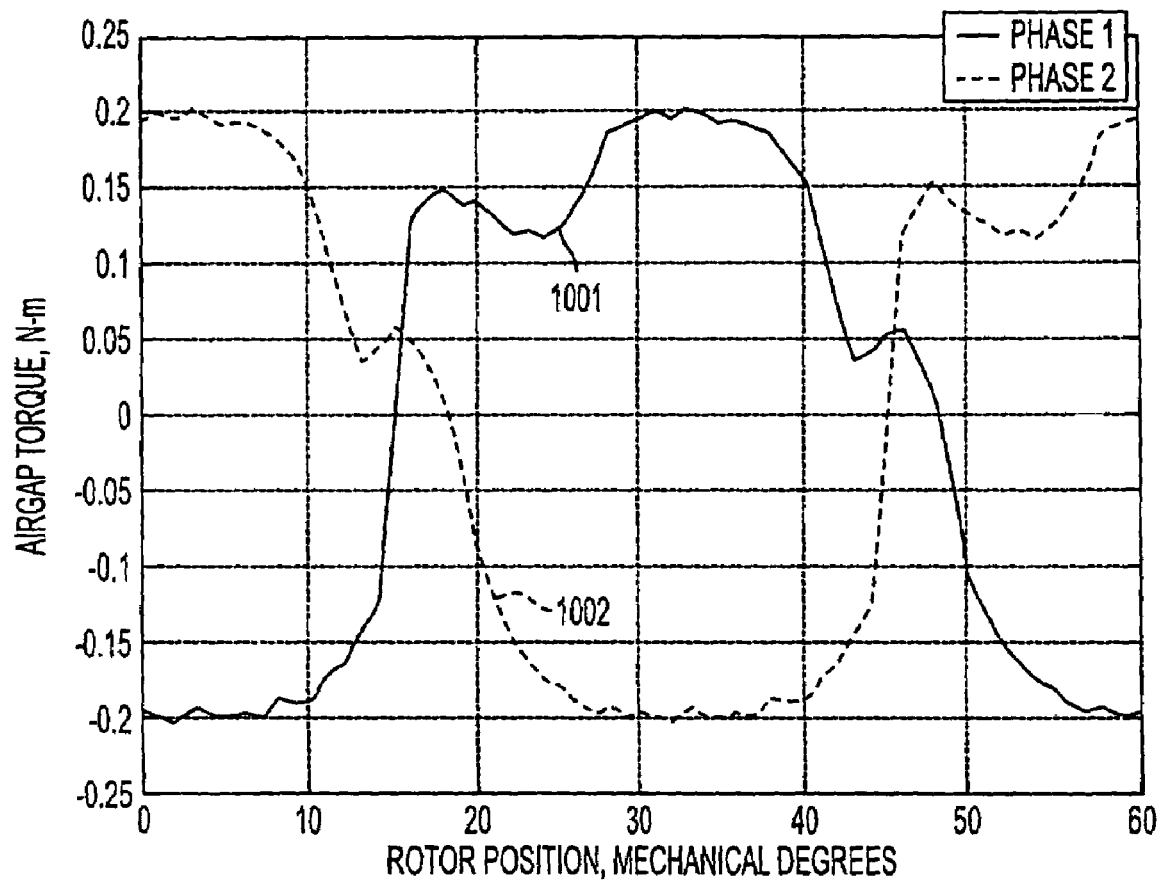
FIG. 10 illustrates a graph of the electromagnetic torque for the TPSRM illustrated by FIG. 8 plotted as a function of its rotor position, using a fixed stator excitation in the phase windings.

FIG. 9 illustrates a graph of the flux linkages for the TPSRM illustrated by FIG. 8 plotted as a function of rotor position, using a fixed stator excitation in the phase windings. FIG. 10 illustrates a graph of the electromagnetic torque for the TPSRM illustrated by FIG. 8 plotted as a function of its rotor position, using a fixed stator excitation in the phase windings. As may be seen by inspection of the phase 1 and 2 flux linkages 901 and 902, respectively, in FIG. 9, the flux linkages for TPSRM 800 have a considerable phase shift. This phase shift provides an unequal torque profile in the positive and negative cycles, as may be seen by inspection of the phase 1 and 2 torques 1001 and 1002, respectively, in FIG. 10. The negative cycles are shorter in duration than the positive cycles. This shows that TPSRM 800 provides a directional preference for starting torque generation.

As may be seen in FIG. 10, there are two dead zones of negative torque in a rotor pitch of 60 degrees. These dead zones create two periods of hesitation in the starting of TPSRM 800 in the counter clockwise direction, assuming, by convention, a negative torque requirement for counter clockwise rotation and a positive torque requirement for clockwise rotation.

Figure 11:
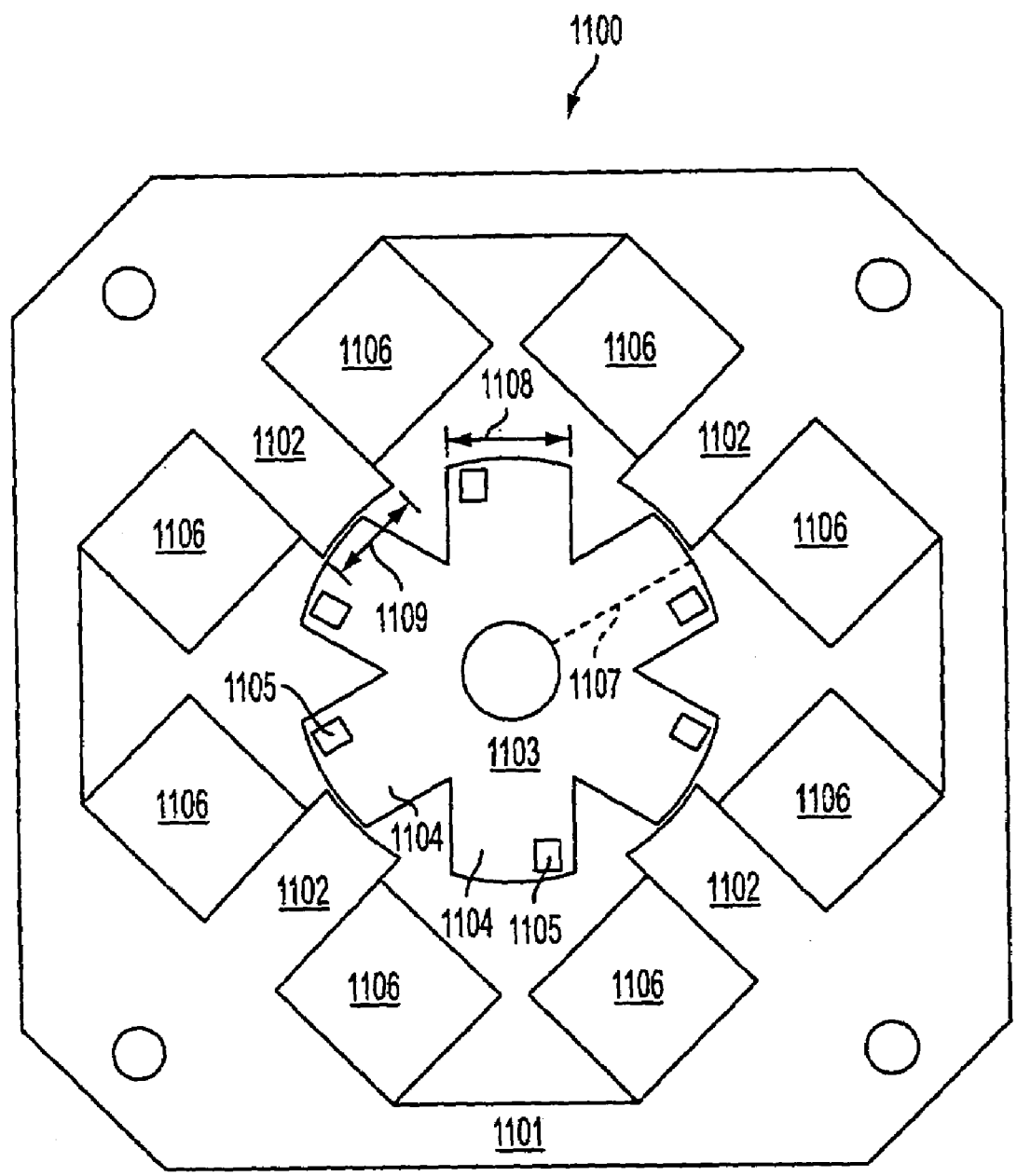
FIG. 11 illustrates a more realistic representation of the TPSRM illustrated by FIG. 7.

FIG. 11 illustrates a more realistic representation of the TPSRM illustrated by FIG. 7. A TPSRM 1100 has a stator 1101 with four salient stator poles 1102 and a rotor 1103 with six salient rotor poles 1104. Each stator pole 1102 has stator windings 1106 wound concentrically around it. Each rotor pole 1104 has a rotor pole slot 1105 that is offset from a central radial axis 1107 of the respective rotor pole to provide a preferred path for the flux to flow between stator 1101 and rotor 1103.

Rotor poles 1104 positioned diametrically opposite one another on rotor 1103 have an opposite or mirror image symmetry about a central radial line passing through the pair of opposing rotor poles. Stated another way, each of rotor poles 1104 forming the rotor pole pair has the same symmetry about its respective central radial axis. TPSRM 1100 differs from TPSRM 700 in that TPSRM 1100's rotor pole slots 1105 have been more realistically illustrated in proportion to the size of their respective rotor poles 1104.

Because four of the six adjacent pairs of rotor poles 1104 have a mirror image symmetry for offset rotor pole slots 1105 and because each rotor pole slot 1105 increases the reluctance of rotor pole 1104 in the vicinity of rotor pole slot 1105, the flux linkage experiences increasing reluctance as a pair of rotor pole slots 1105 is rotated clockwise toward one of rotor poles 1104.

Figure 12:
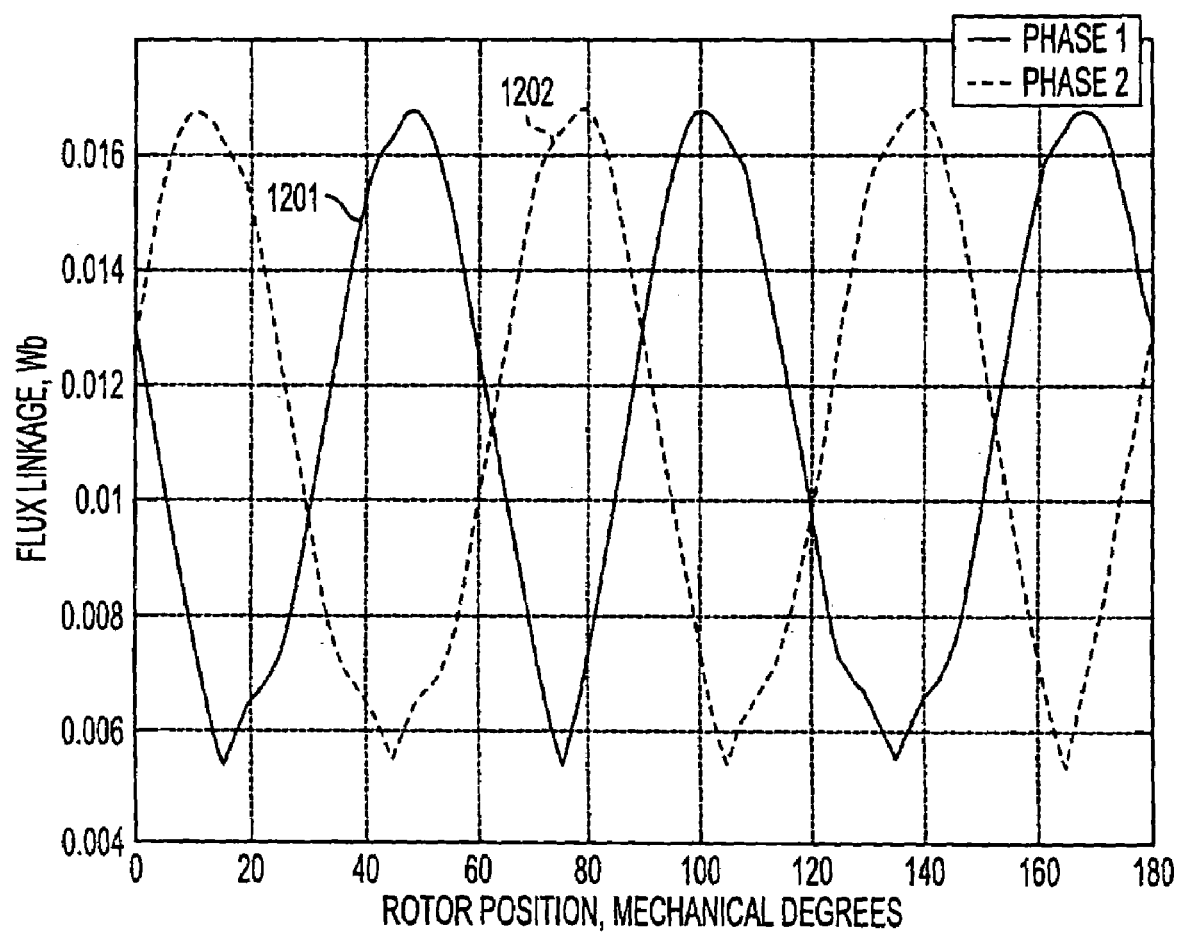
FIG. 12 illustrates a graph of the flux linkages for the TPSRM illustrated by FIG. 11 plotted as a function of rotor position, using a fixed stator excitation in the phase windings.
Figure 13:
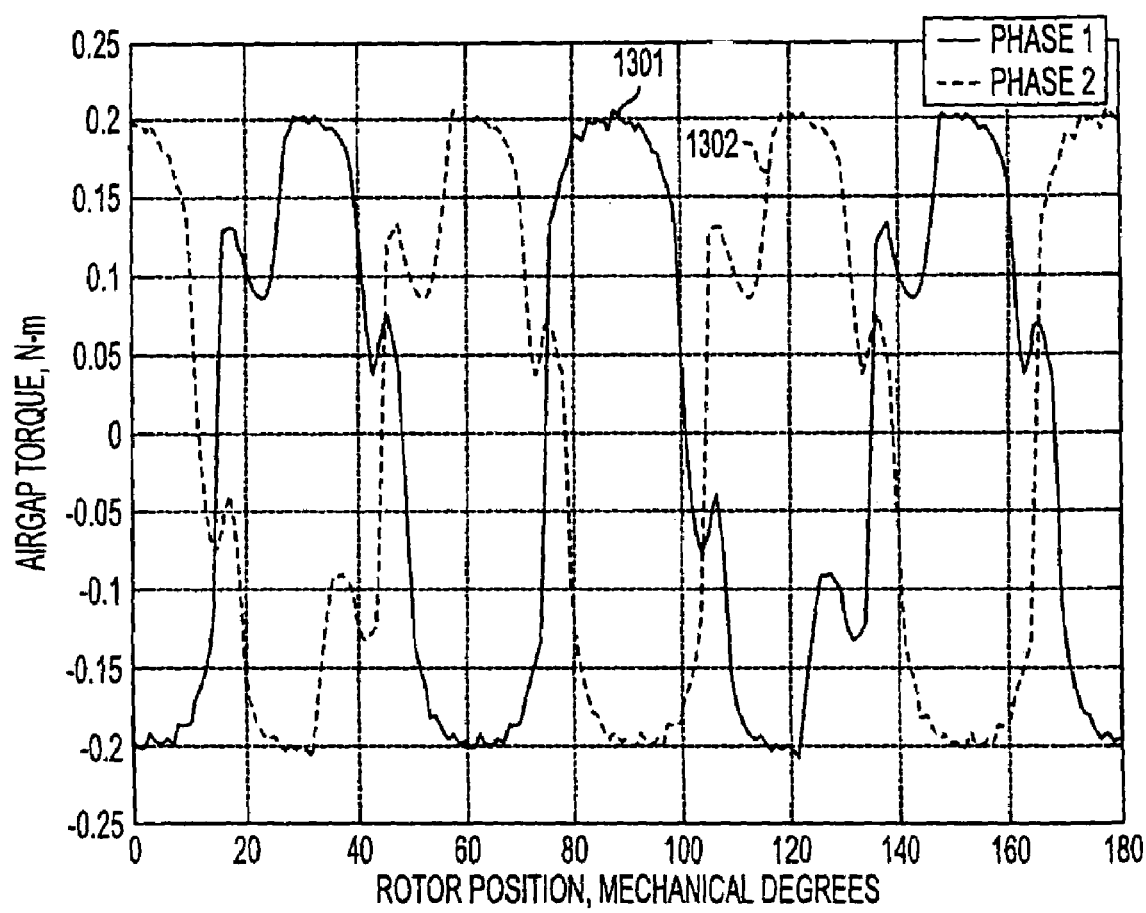
FIG. 13 illustrates a graph of the electromagnetic torque for the TPSRM illustrated by FIG. 11 plotted as a function of its rotor position, using a fixed stator excitation in the phase windings.

FIG. 12 illustrates a graph of the flux linkages for the TPSRM illustrated by FIG. 11 plotted as a function of rotor position, using a fixed stator excitation in the phase windings. FIG. 13 illustrates a graph of the electromagnetic torque for the TPSRM illustrated by FIG. 11 plotted as a function of its rotor position, using a fixed stator excitation in the phase windings. As may be seen by inspection of the phase 1 and 2 flux linkages 1201 and 1202, respectively, in FIG. 12, the adjacent pair of rotor poles 1104 generate somewhat similar but positionally shifted flux linkages 1201, 1202. The positionally shifted flux linkages 1201, 1202 create a phase shift of the electromagnetic torque, as may be seen by inspection of the phase 1 and 2 torques 1301 and 1302, respectively, in FIG. 13.

The stator flux linkages 1201, 1202 of the two phases are not symmetric to each other, as their peaks and troughs occur at irregular intervals, rather than at equal intervals of rotor position. Such an irregularity has been produced by the mirror image slotted symmetry of the adjacent rotor pole pairs of TPSRM 1100.

Referring again to FIG. 12, it may be seen that flux linkages 1201 and 1202 are not linear. Referring to FIG. 11, it may be seen that rotor pole arc widths 1108 are not much wider than stator pole arc widths 1109. Rotor pole arc widths 1108 are only wider by an amount required to ensure that rotor poles 1104 do not over-saturate when their unslotted regions face stator poles 1102, during their alignment. For applications where over-saturation will not occur, rotor and stator pole arc widths 1108 and 1109, respectively, may have the same width.

The nonlinear flux linkage 1201, 1202 versus rotor position characteristics produce a torque that is nonlinear with respect to the rotor position. Therefore, if the excitation is constant, the torque is not constant over the range of rotor positions, as may be seen from FIG. 13. Such a torque generation may present a problem in TPSRM 1100 if it is left uncontrolled. This problem is overcome by controlling the current as a function of stator current. Controlling the current in this manner is only needed for high performance applications and for positioning applications at very low speeds. All other applications requiring high speed (e.g., >300 rpm) may not require low torque ripples or pulsations, as they do not present a significant problem.

As for starting torque generation in TPSRM 1100, there are no simultaneous zero-torque instances for the two stator phases. At all times, either positive torque or negative torque is available in TPSRM 1100. If TPSRM 1100 is standing at a rotor position where the torque is positive and a clockwise rotation is desired, then just energizing that stator phase is sufficient to start the machine. If the torque at that point happens to be negative for both phases, as in some rotor positions, then one or both stator phases can be energized to provide negative torque and generate counterclockwise rotation.

When the rotor rotates to a point where positive torque can be generated, then the corresponding stator phase that can provide positive torque is energized, thereby allowing the machine to run in the clockwise direction. When the torque is small, near its zero crossover point (e.g., about 25% of the peak torque or so), the current may be increased to enhance the torque for TPSRM 1100's starting. Alternatively, both stator phases can be excited to produce a combined torque that will meet the required starting torque. Such measures are only necessary when stator phase torques 1301 and 1302 are in the vicinity of zero crossover instances.

From this discussion, it may be seen that the torque characteristics of TPSRM 1100 are fully capable of delivering a four-quadrant operation, including that of starting in both directions, though there could be hesitation during starting depending on where the rotor is at stand-still. The majority of practical applications can accept this hesitation.

By sophisticated control during starting, it is entirely possible to eliminate hesitation. This control can be done by braking the machine to stop at predetermined rotor positions, so that the starting torque can be at a maximum as well as in a position to start in the desired direction. Alternatively, this control may be provided by performing an initial run of TPSRM 1100, to position rotor 1103 in a favorable rotor position for starting and running in a particular direction, before coupling TPSRM 1100 to its load. The control for such operation is elementary and, therefore, its discussion is omitted.

TPSRM 1100 provides the following advantages:

1. The offset rotor pole slot 1105 of rotor pole 1104 increases or decreases the effective air gap in a clockwise or counter clockwise direction, depending on whether rotor pole slot 1105 is offset to the right or left side of radial axis 1107, respectively.

2. The offset slotting of rotor pole 1104 provides the preferential torque generation in one direction, with no zero-torque instances for the two phases combined.

3. Starting TPSRM 1100 in the clockwise direction, when the phase corresponding to that direction of rotation has zero torque, is accomplished as follows. When the torque for one phase is negative and the other phase is zero, the machine phase with the negative torque is excited, so that TPSRM 1100 runs in the counter clockwise direction initially. TPSRM 1100's direction can be reversed to the clockwise direction by the other phase excitation, as the rotor pole moves by 30 degrees, for a 4 pole stator and 6 pole rotor. This provides savings in machine and power converter cost, mainly arising from the small number of phases.

4. TPSRM 1100 is inherently capable of four-quadrant operation with a two-phase power converter. Such four-quadrant operation capability places TPSRM 1100 at an advantage in multiple applications that are emerging in appliances.

5. Rotor poles 1104 and stator poles 1102 have symmetric structures and, therefore, no mechanical unbalance is foreseen. Hence, no radial pull forces are expected in TPSRM 1100. This leads to a longer bearing life and quieter machine operation.

6. TPSRM 1100 can also be run as a single-phase SRM with one phase serving as a main phase and the other serving as an auxiliary phase, similar to that of the single phase induction motor.

7. Slotting rotor poles 1104 removes iron from rotor 1103 and reduces its weight. This has the beneficial effect of lowering rotor 1103's inertia and increasing its acceleration capability, both desirable qualities in aerospace and defense applications and also in machine tool servo and spindle motor drives.

8. The manner in which rotor pole slots 1105 are placed in adjacent rotor poles 1104 determines the asymmetric or symmetric nature of the torque, in the two phases, and the amount of torque with regard to rotor position.

9. The rotor pole slots 1105 can be applied not only to one- and two-phase machines, but also to multi-phase machines to shape their torque, reduce acoustic noise, and to increase power density.

10. Also, rotor pole slots 1105 can be filled with permanent magnets to create a new class of interior permanent magnet machines that are ideal for high-speed operation and to produce a torque by augmenting the reluctance torque with synchronous torque.

11. Rotor pole slots 1105 can also be used to house permanent magnets to serve as sensors in measuring the rotor position required in the control of TPSRM 1100. Thus, the rotor pole slots serve two different functions, both torque shaping and sensor housing.

12. The intent of rotor pole slots 1105 is not to create a linear relationship between the flux linkages versus rotor position, as in some related art devices, but to obtain the overlapping nonzero torque characteristics, without unduly extending the rotor pole arc. Also, TPSRM 1100 provides a self-starting capability with even a smaller rotor pole arc.

Figure 14:
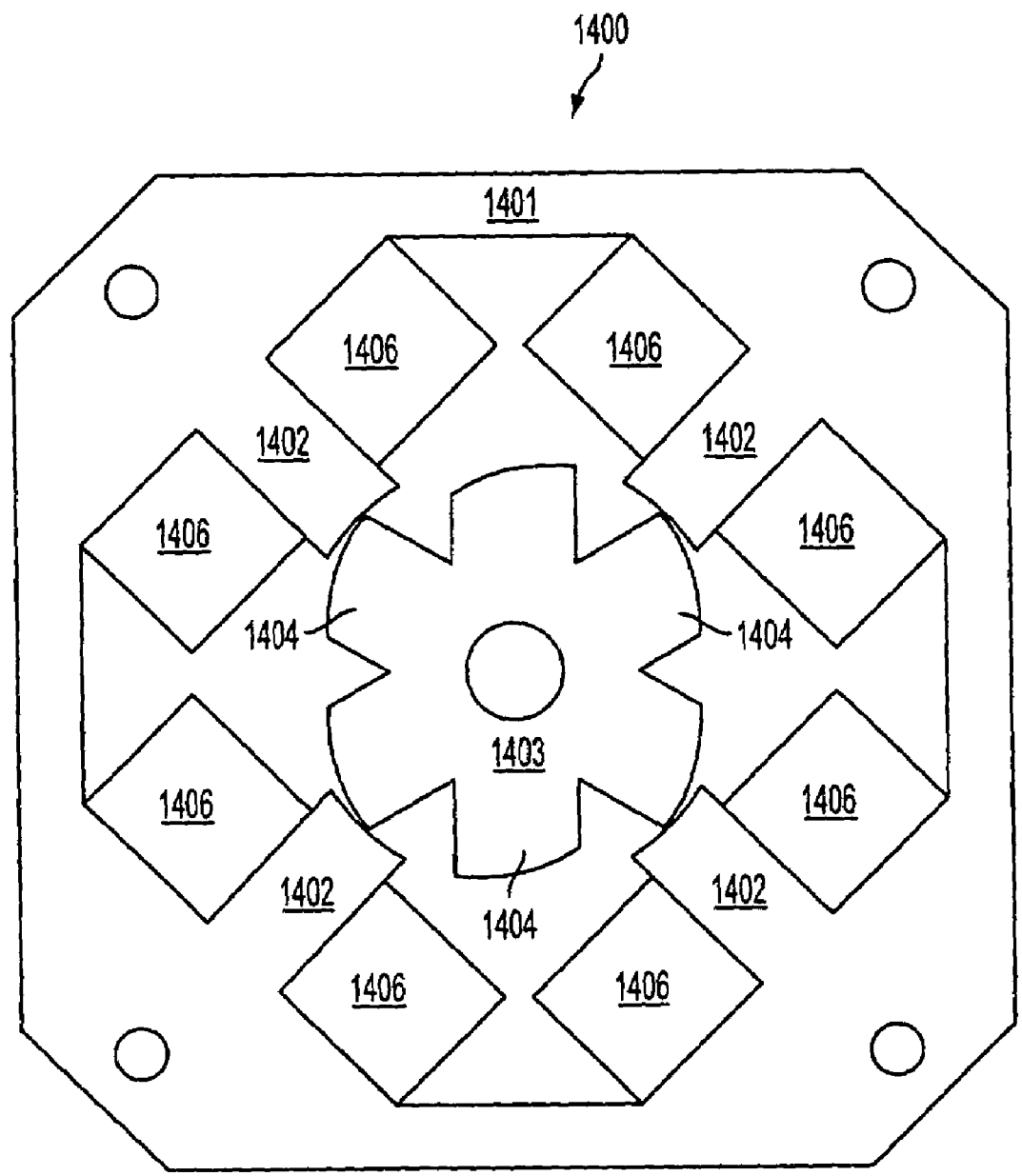
FIG. 14 illustrates a TPSRM having contoured rotor poles.

FIG. 14 illustrates a TPSRM having contoured rotor poles. A TPSRM 1400 has a stator 1401 with four salient stator poles 1402 and a rotor 1403 with six salient rotor poles 1404. Each stator pole 1402 has stator windings 1406 wound concentrically around it. Each rotor pole 1404 has a gradually tapered distal end to provide a preferred path for the flux to flow between stator 1401 and rotor 1403. Tapering the distal end of rotor pole 1404 increases the air gap between rotor pole 1404 and stator pole 1402, when these poles are aligned. The increased air gap creates increased reluctance, which decreases the flux that may flow between stator pole 1402 and the tapered portion of rotor pole 1404. As a result, tapering the distal ends of rotor poles 1404 provides a preferential starting direction for rotor 1403.

Tapering the distal ends of rotor poles 1404 also provides the necessary high rate of change for the flux linkages, both in the counter clockwise direction and in the clockwise direction. The high rate of flux linkage for both rotational directions generates a high amount of torque in the respective directions and, hence, rotation in these directions.

Figure 15:
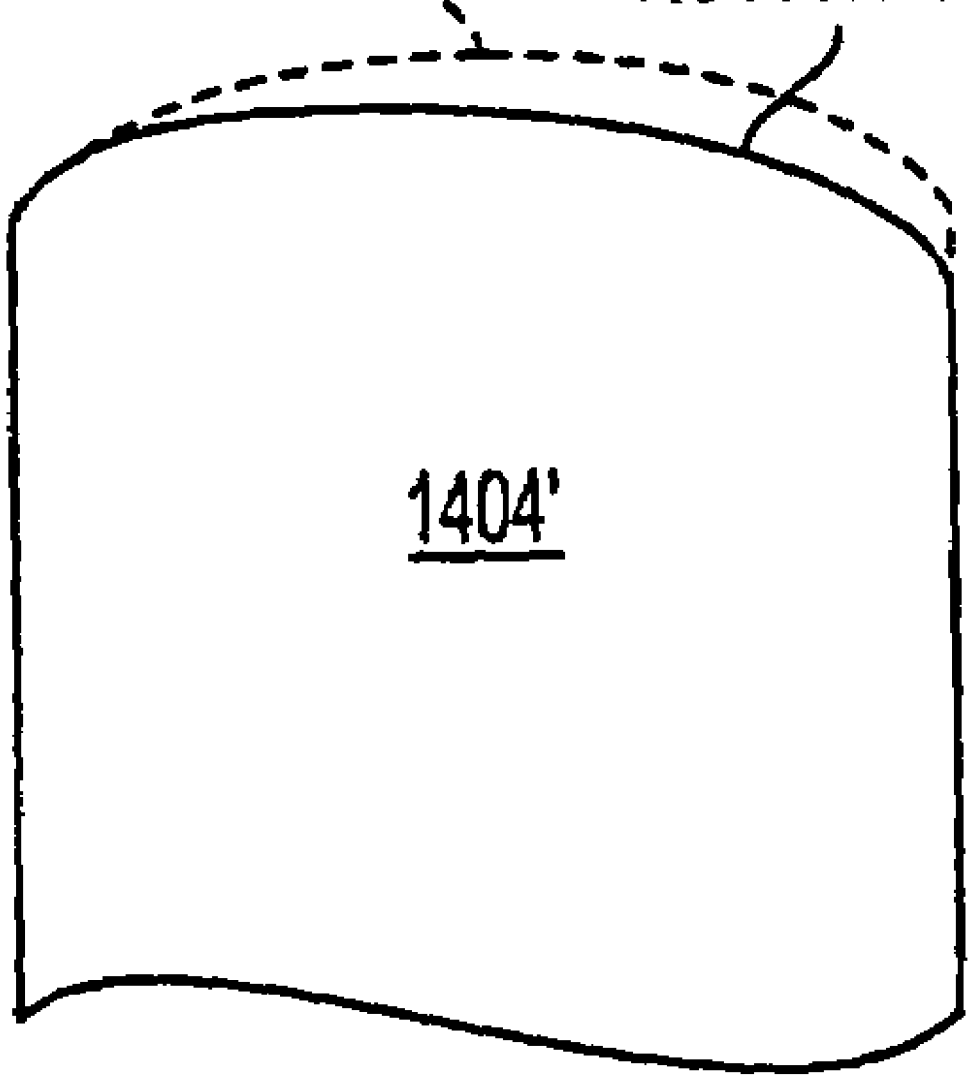
FIG. 15 illustrates with more detail the shaping of the rotor pole illustrated by FIG. 14.

FIG. 15 illustrates, in greater detail, the shaping of the rotor pole illustrated by FIG. 14. As illustrated in FIG. 15, the distal end of rotor pole 1404', which end would face stator pole 1402 when the two poles are aligned, is gradually shaped with a monotonically increasing air gap from one side of the distal end arc to the other.

Another shape that could have equivalent effects is achieved by slotting the rotor poles with a narrowly increasing air gap, with a thin lip of rotor iron facing the stator pole. This shape will make the rotor pole uniform and smooth, similar to that of the stator pole. However, this configuration may allow the thin lip of the rotor to become saturated, at certain angles, resulting in undesirable vibrations.

Figure 16:
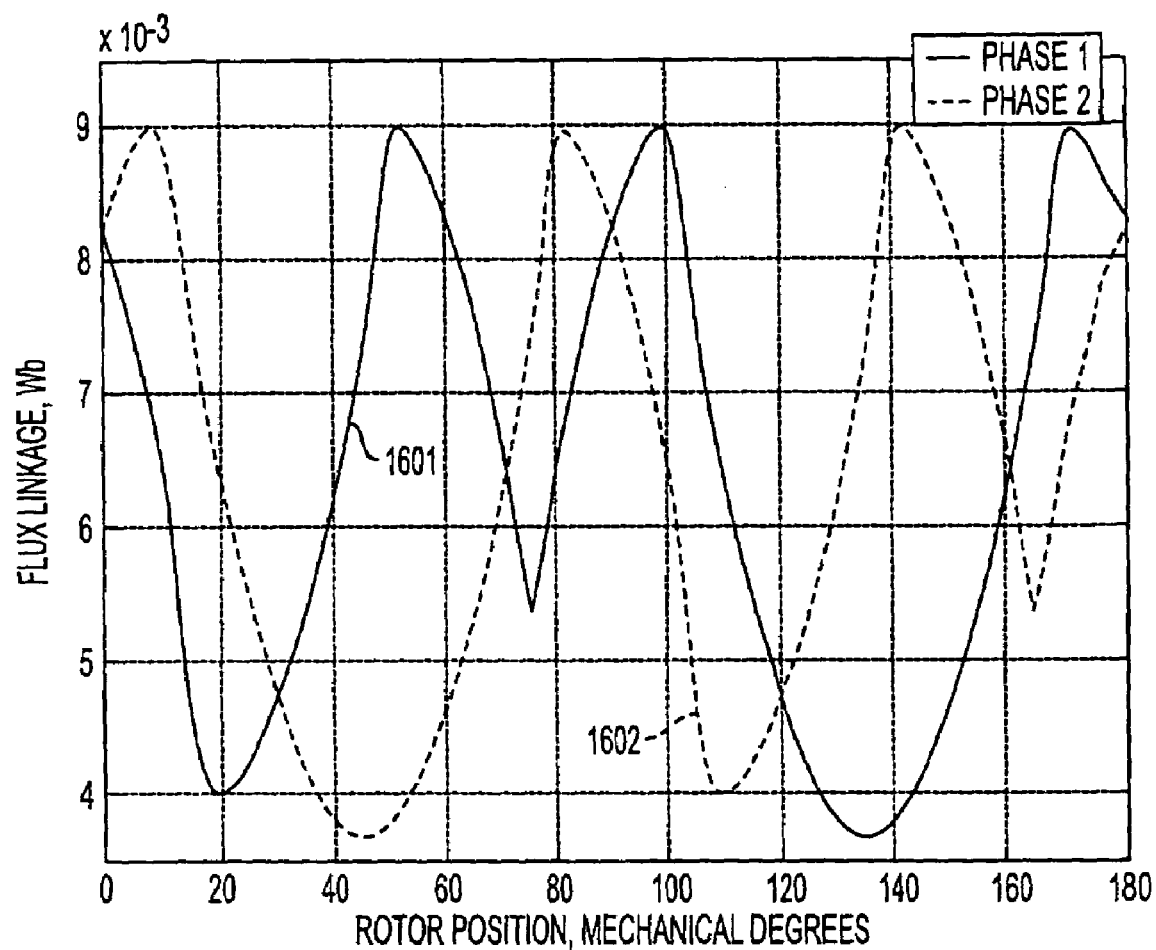
FIG. 16 illustrates a graph of the flux linkages for the TPSRM illustrated by FIG. 14 plotted as a function of rotor position, using a fixed stator excitation in the phase windings.
Figure 17:
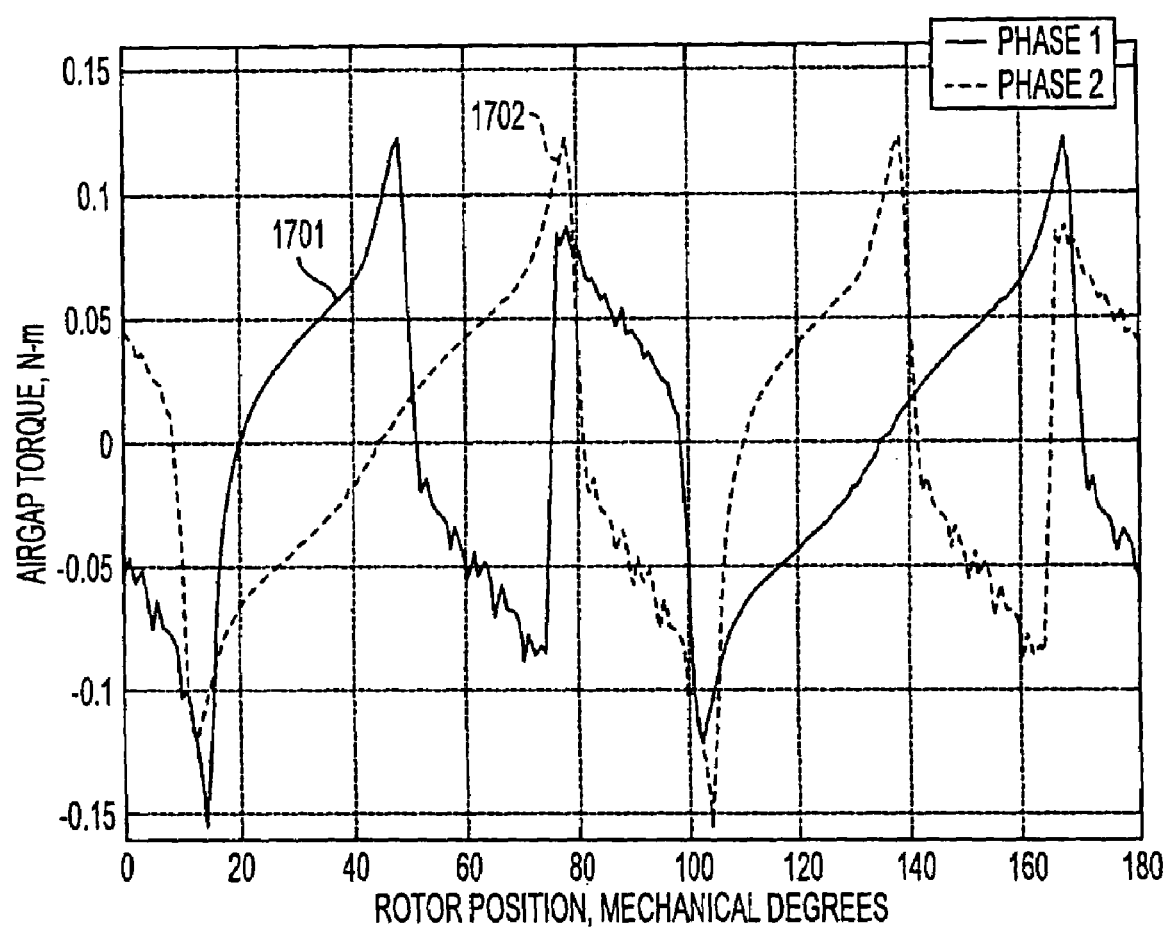
FIG. 17 illustrates a graph of the electromagnetic torque for the TPSRM illustrated by FIG. 14 plotted as a function of its rotor position, using a fixed stator excitation in the phase windings.

FIG. 16 illustrates a graph of the flux linkages for the TPSRM illustrated by FIG. 14 plotted as a function of rotor position, using a fixed stator excitation in the phase windings. FIG. 17 illustrates a graph of the electromagnetic torque for the TPSRM illustrated by FIG. 14 plotted as a function of its rotor position, using a fixed stator excitation in the phase windings. The characteristics of phase 1 and 2 flux linkages 1601 and 1602, respectively, are ideal for position estimation of rotor 1403. The characteristics of phase 1 and 2 torques 1701 and 1702, respectively, have much sharper peaks than those of the slotted TPSRMs, but generally have the same trend. The sharpness in the torque characteristics can be modified by the contouring profile.

Figure 18:
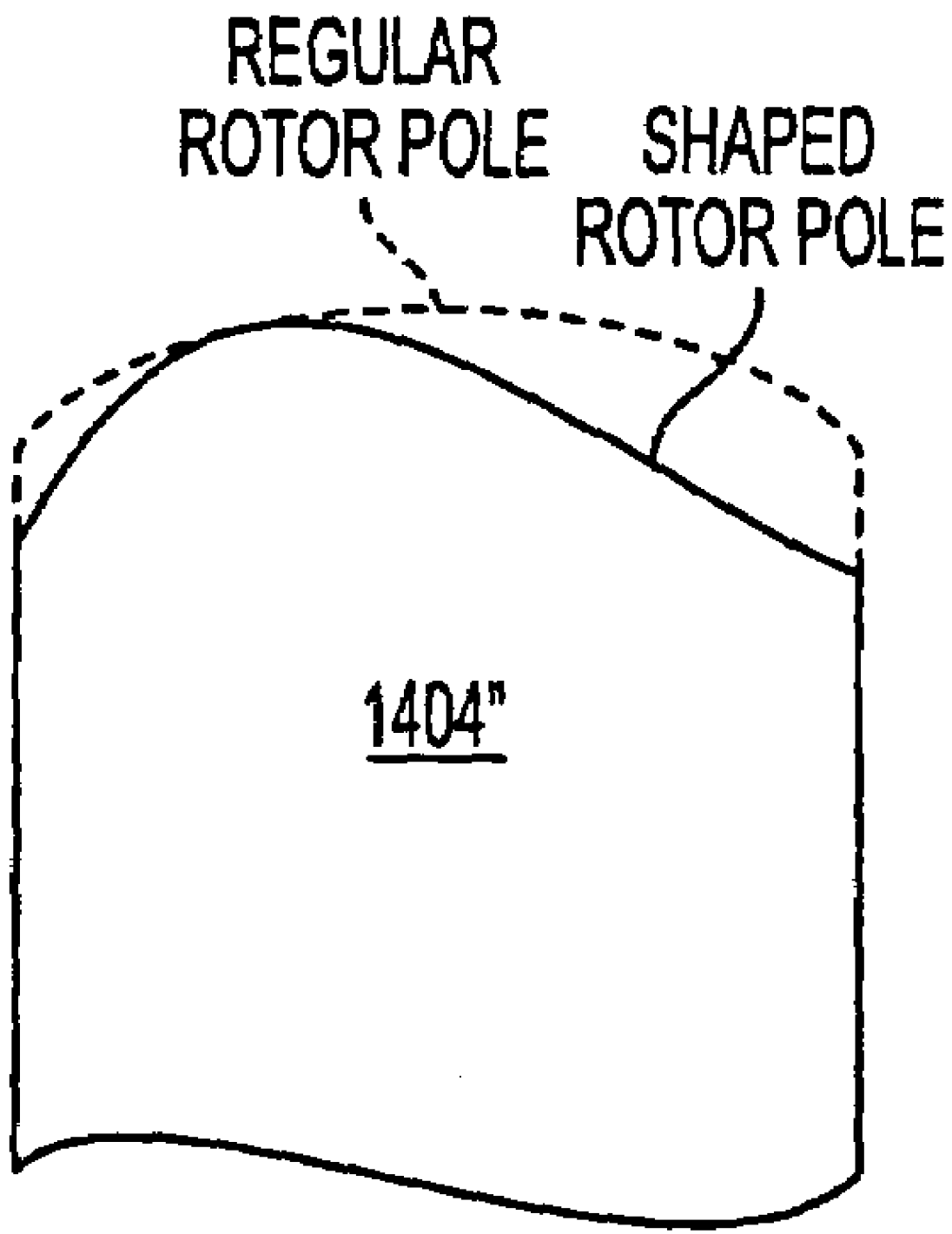
FIG. 18 illustrates another contouring profile for the rotor poles of the TPSRM illustrated by FIG. 14.

FIG. 18 illustrates another contouring profile for the rotor poles of the TPSRM illustrated by FIG. 14. Rotor pole 1404' is shaped to have a continually decreasing air gap as the distal end arc is traversed from one side to a point along the arc toward the other side. At this point along the arc, which is located about ⅓ of the arc length away from the side of rotor pole 1404' in this example, a minimum air gap is achieved. As the arc is traversed farther along its length from this point toward the other side, the air gap continually increases until a maximum air gap is achieved at the other side of the distal end arc. This contouring profile provides high saliency and, hence, good starting torque in both directions. Again, symmetry for a pair of rotor poles is achieved in construction.

Figure 19:
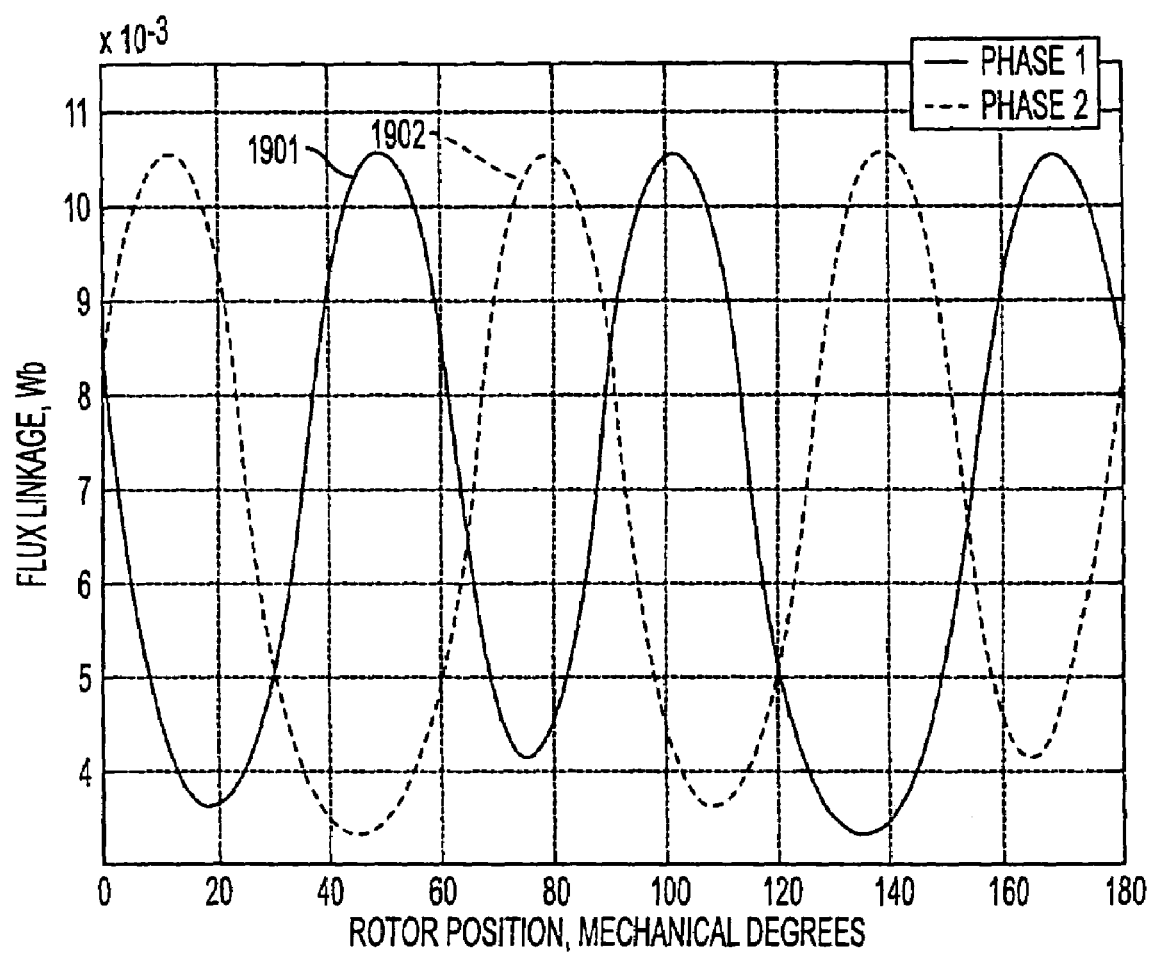
FIG. 19 illustrates a graph of the flux linkages plotted as a function of rotor position for the TPSRM of FIG. 14 having the contoured rotor pole shaping illustrated by FIG. 18.
Figure 20:
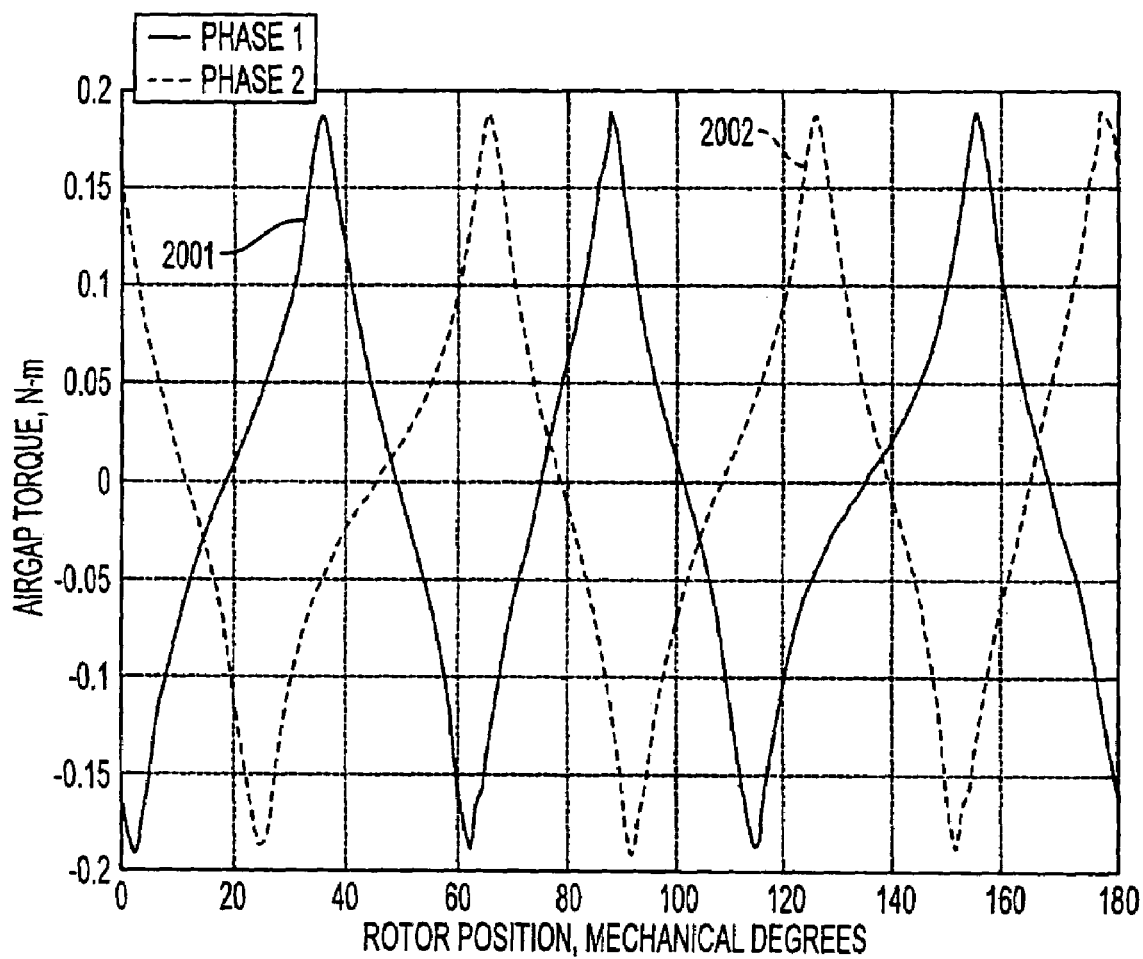
FIG. 20 illustrates a graph of the torque characteristics plotted as a function of rotor position for the TPSRM of FIG. 14 having the contoured rotor pole shaping illustrated by FIG. 18.

FIG. 19 illustrates a graph of the flux linkages plotted as a function of rotor position for the TPSRM of FIG. 14 having the contoured rotor pole shaping illustrated by FIG. 18. FIG. 20 illustrates a graph of the torque characteristics plotted as a function of rotor position for the TPSRM of FIG. 14 having the contoured rotor pole shaping illustrated by FIG. 18. Phase 1 and 2 flux linkages 1901 and 1902, respectively, have less-sharp-changes than do those illustrated by FIG. 15. However, phase 1 and 2 torque characteristics 2001 and 2002, respectively, have sharper torque changes. Flux linkages 1901 and 1902 and torque characteristics 2001 and 2002 are all functions of the contouring variables, such as where the peak exists in the rotor pole, the gradient on each side of the tip of the pole, etc. Regardless of whether TPSRM 1400 employs the contouring of rotor poles 1404' or 1404", both give self-starting capabilities uniformly in both directions.

Figure 21:
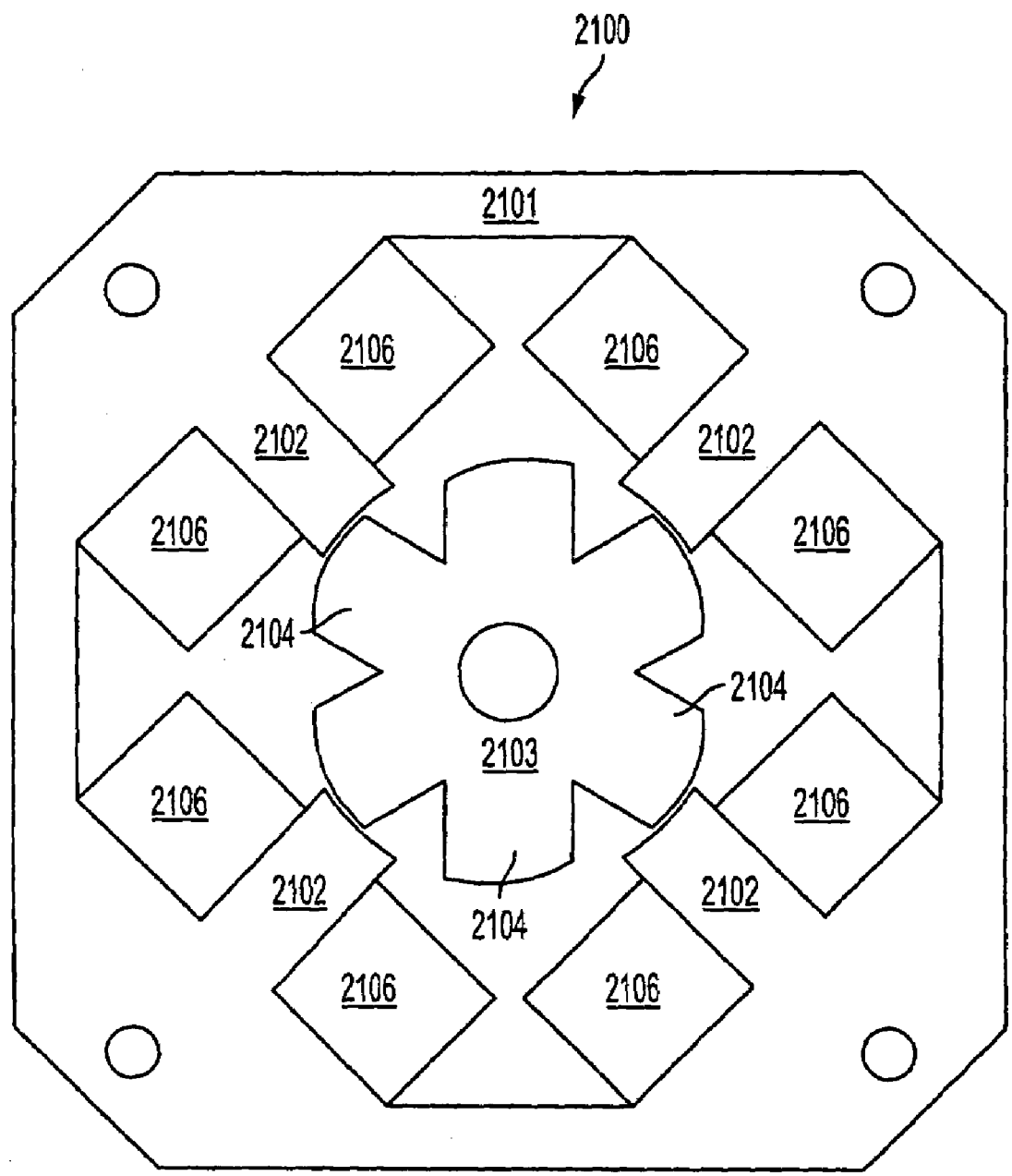
FIG. 21 illustrates a TPSRM having half rotor pole contouring.

FIG. 21 illustrates a TPSRM having half rotor pole contouring. A TPSRM 2100 has a stator 2101 with four salient stator poles 2102 and a rotor 2103 with six salient rotor poles 2104. Each stator pole 2102 has stator windings 2106 wound concentrically around it. Each rotor pole 2104 has a gradually tapered distal end on one half of the distal end arc, to provide a preferred path for the flux to flow between stator 2101 and rotor 2103. The other half of the distal end arc of each rotor pole 2104 is not tapered, but has the constant air gap of a conventional arc, such as the arc of a circle, when rotor pole 2104 is aligned with stator pole 2102.

Figure 22:
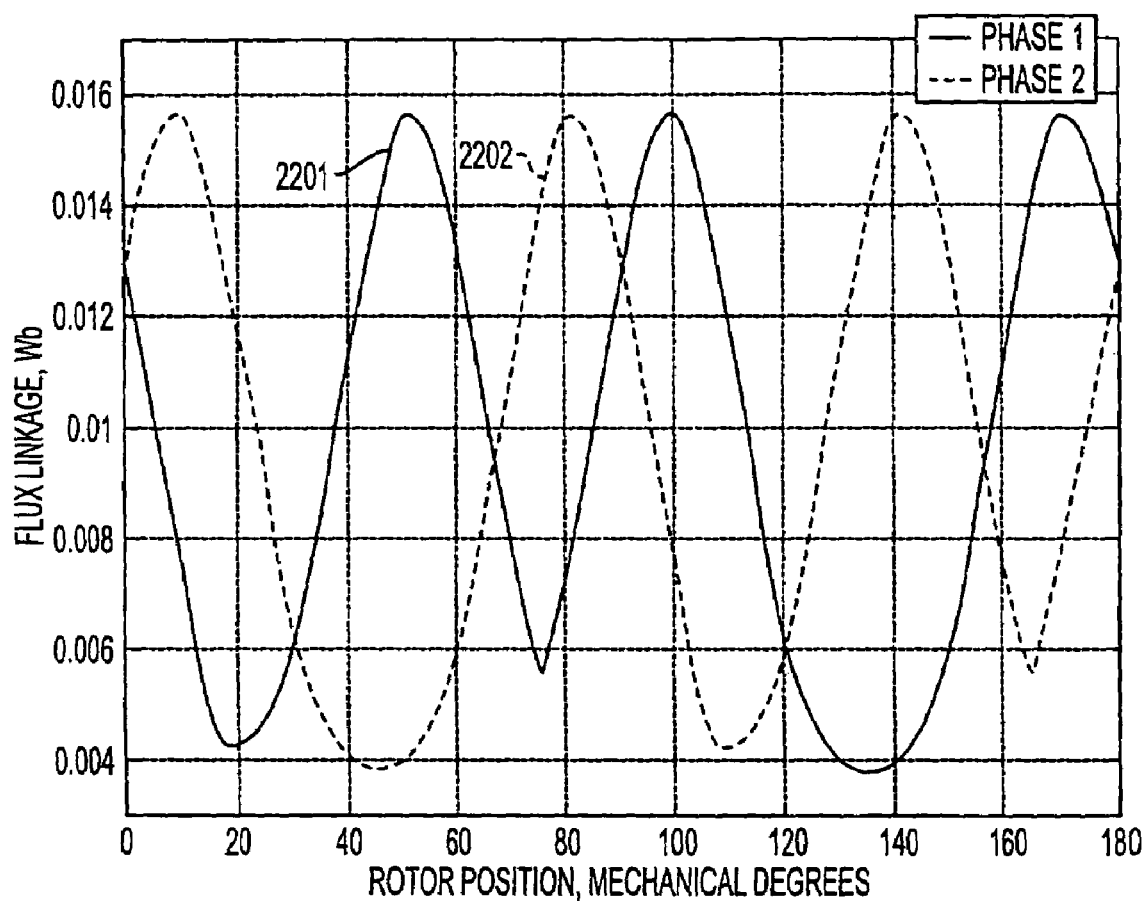
FIG. 22 illustrates a graph of the flux linkages for the TPSRM illustrated by FIG. 21 plotted as a function of rotor position.
Figure 23:
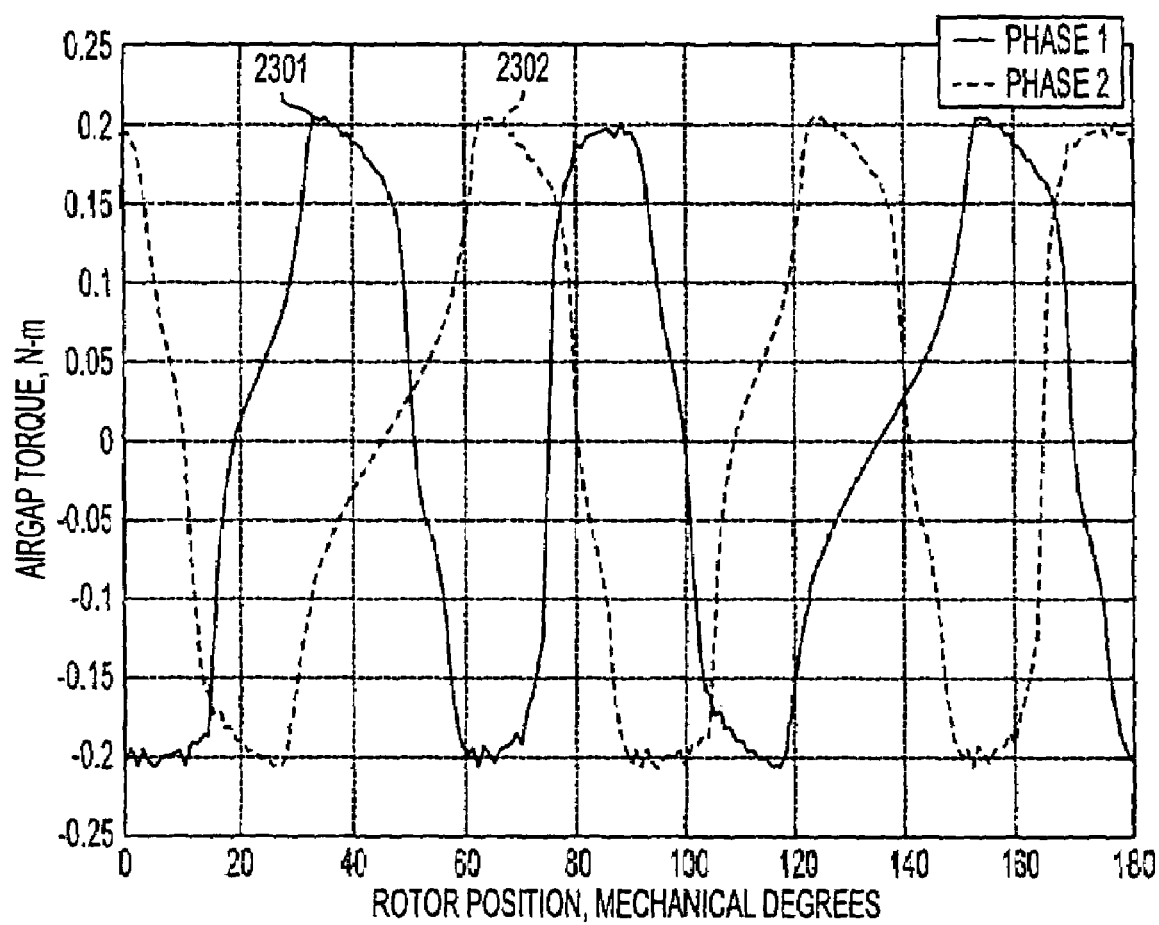
FIG. 23 illustrates a graph of the electromagnetic torque for the TPSRM illustrated by FIG. 21 plotted as a function of its rotor position.

FIG. 22 illustrates a graph of the flux linkages for the TPSRM illustrated by FIG. 21 plotted as a function of rotor position. FIG. 23 illustrates a graph of the electromagnetic torque for the TPSRM illustrated by FIG. 21 plotted as a function of its rotor position. Phase 1 and 2 flux linkages 2201 and 2202, respectively, are much more softly changing. Hence, phase 1 and 2 torque characteristics 2301 and 2302, respectively, are much less peaky compared to the corresponding torque characteristics for the contoured rotor pole 1404", illustrated by FIG. 20. TPSRM 2100 also lends itself to self-starting in both directions.

TPSRMs 1400 and 2100 provide the following advantages:

1. The shaping of the rotor pole increases or decreases the effective air gap in a clockwise or counter clockwise direction, depending on whether the larger air gap is on the left or right side, respectively.

2. The rotor pole shaping provides the preferential torque generation in one direction, with no zero-torque instances in its rotor-position for the two phases-combined.

3. Starting the TPSRM in the clockwise direction, when the phase corresponding to that direction of rotation has zero torque, is accomplished as follows. When the torque for one phase is negative and zero for the other phase, the machine phase with the negative torque is excited, so that the TPSRM runs in the counter clockwise direction, initially. The TPSRM's direction can be reversed to the clockwise direction by the other phase excitation, as the rotor pole moves by 30 degrees, for a 4 pole stator and 6 pole rotor. This provides savings in machine and power converter cost, mainly arising from the small number of phases.

4. The TPSRM is inherently capable of four-quadrant operation with a two-phase power converter. Such four-quadrant operation capability places the TPSRM at an advantage in multiple applications that are emerging in appliances.

5. The rotor is symmetric only for a pair of rotor poles and, therefore, no undue mechanical unbalance is foreseen. Hence, no radial pull forces are expected in the TPSRM.

6. The TPSRM can also be run as a single-phase SRM with one phase serving as a main phase and the other serving as an auxiliary phase.

Figure 24:
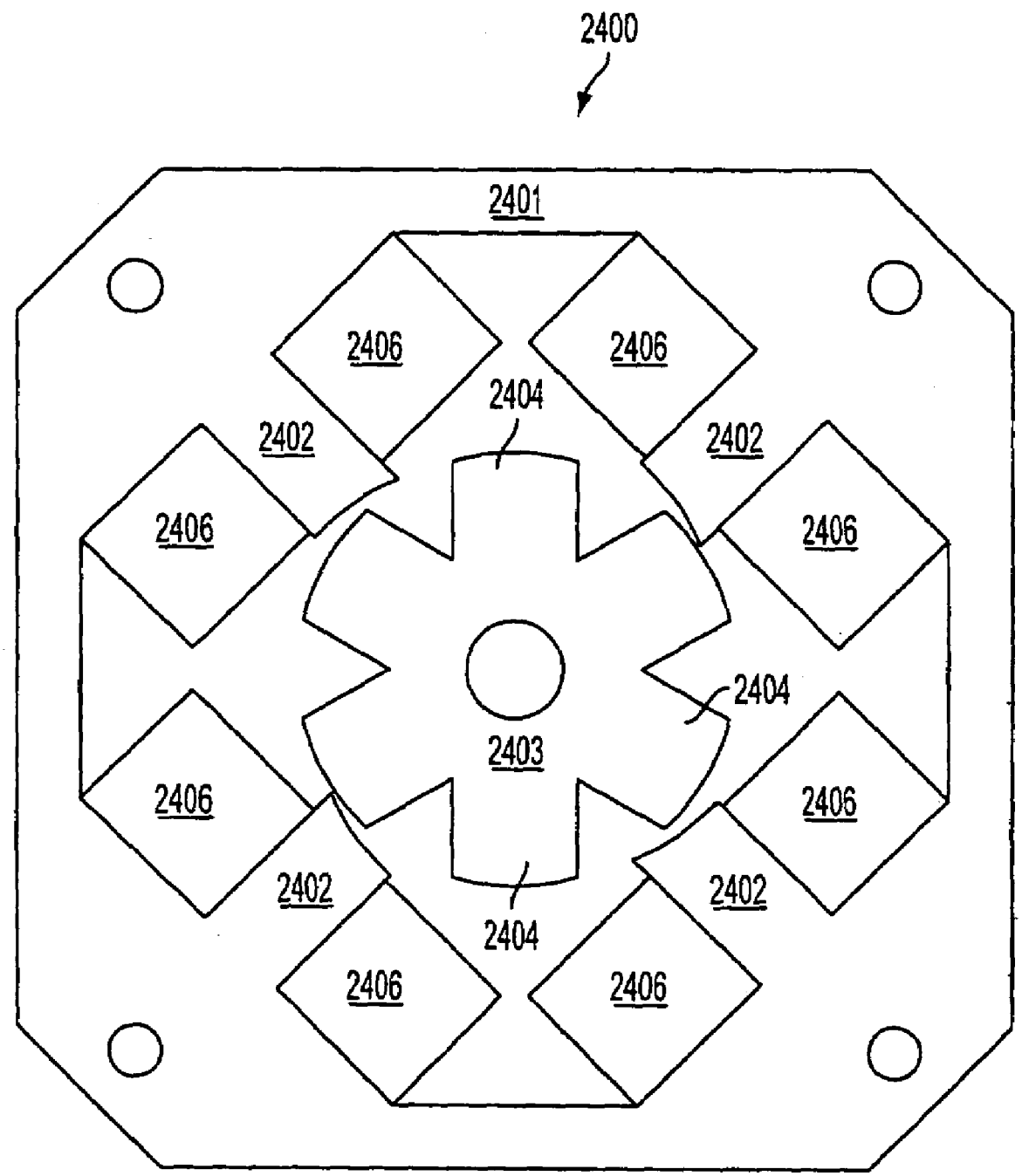
FIG. 24 illustrates a TPSRM having its stator poles contoured.

FIG. 24 illustrates a TPSRM having its stator poles contoured. A TPSRM 2400 has a stator 2401 with four salient stator poles 2402 and a rotor 2403 with six salient rotor poles 2404. Each stator pole 2402 has stator windings 2406 wound concentrically around it. Also, each stator pole 2402 has a gradually tapered distal end to provide a preferred path for the flux to flow between stator 2401 and rotor 2403. Tapering the distal end of stator pole 2402 increases the air gap between rotor pole 2404 and stator pole 2402, when these poles are aligned. The increased air gap creates increased reluctance, which decreases the flux that may flow between the tapered portion of stator pole 2402 and rotor pole 2404. As a result, tapering the distal ends of stator poles 2402 provides a preferential starting direction for rotor 2403.

The same advantages obtained by contouring the rotor poles, as described previously, can be obtained by contouring the stator poles, and the stator poles may be contoured in the same manner described for the rotor poles. Therefore, a repetition of this discussion and the advantages flowing from these structures is omitted for brevity.

Figure 25A:
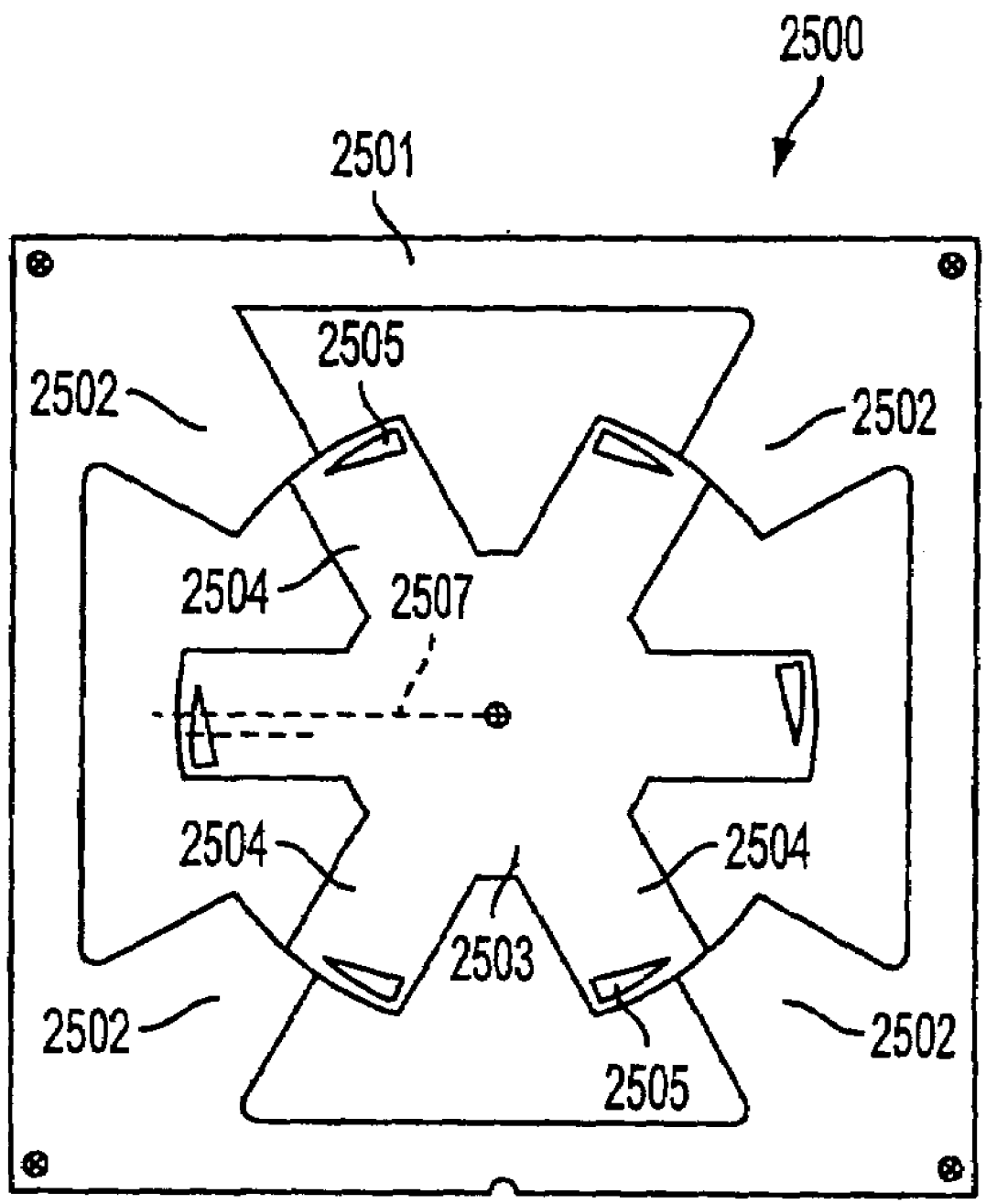
FIG. 25(a) illustrates a TPSRM having an offset arcuate wedge-shaped slot in each rotor pole.
Figure 25B:
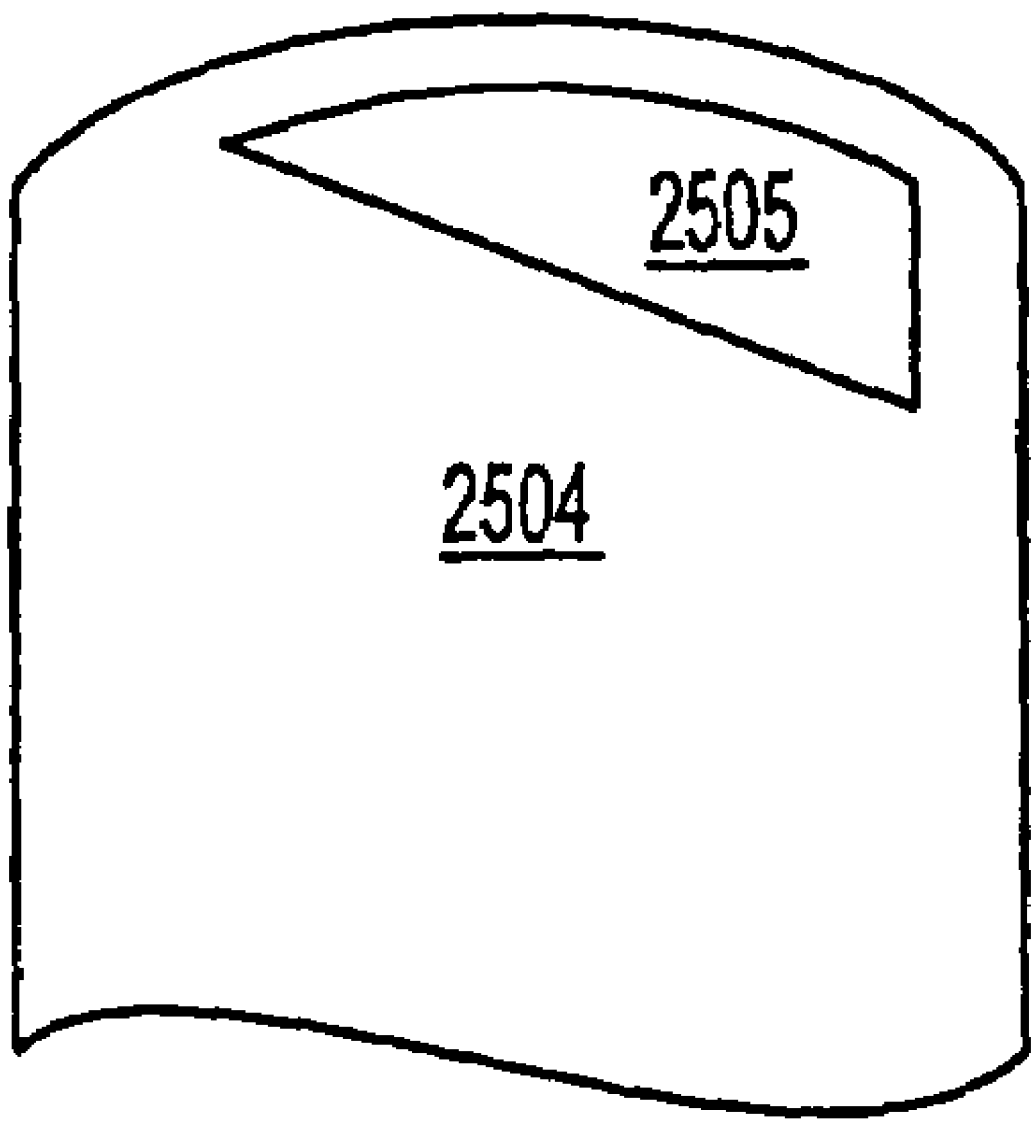
FIG. 25(b) illustrates the slotting configuration of the rotor-poles illustrated in FIG. 25(a) in greater detail.

FIG. 25(a) illustrates a TPSRM having an offset arcuate wedge-shaped slot in each rotor pole. FIG. 25(b) illustrates the slotting configuration of the rotor poles illustrated in FIG. 25(a) in greater detail. A TPSRM 2500 has a stator 2501 with four salient stator poles 2502 and a rotor 2503 with six salient rotor poles 2504. Each rotor pole slot 2505 is formed such that a top edge, which is closest to the distal end of rotor pole 2504, has the same shape as the distal end arc of rotor pole 2504. A bottom edge of each rotor pole slot 2505 is tapered such that the height between the bottom and top edges of each rotor pole slot 2505 increases with distance from a central radial axis of the respective rotor pole 2504. This effectively increases the air gap of rotor pole 2504, on the side of rotor pole 2504 having the rotor pole slot 2505.

Moreover, the effective air gap increases along the distal end arc of rotor pole 2504 in correspondence with the distance traversed along the arc from the central radial axis. Furthermore, rotor pole slot 2505 is offset from the central radial axis of the respective rotor pole 2504, so as to provide the asymmetry with respect to stator phases A and B. The effective air gap asymmetry of offset rotor pole slots 2505 provides the torque asymmetry needed to assure a non-zero torque for every rotor position.

Rotor poles 2504 are positioned diametrically opposite one another on rotor 2503 to have an opposite or mirror image symmetry about a central radial line passing through the opposing rotor pole pair. Stated another way, each of rotor poles 2504 forming the rotor pole pair has the same symmetry about its respective central radial axis. This configuration distributes the weight of rotor poles 2504 symmetrically. Four of the six adjacent pairs of rotor poles 2504 also have an opposite or mirror image symmetry about their respective central radial axes. For illustration, the rotor pole slots are somewhat exaggerated in FIG. 25.

Figure 26:
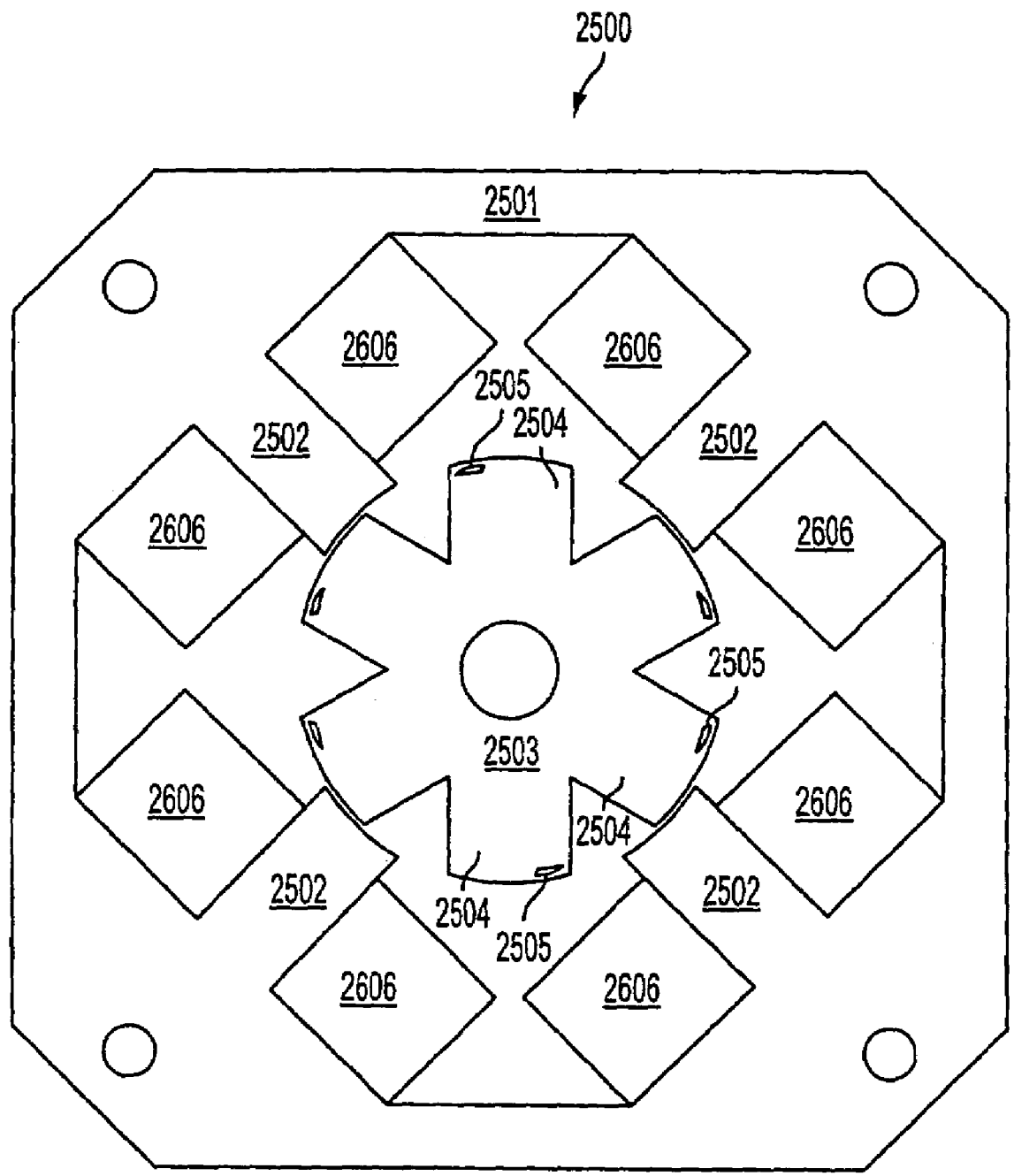
FIG. 26 illustrates the TPSRM of FIG. 25 with the rotor pole slots more realistically illustrated in proportion to the size of their respective rotor poles.
Figure 27:
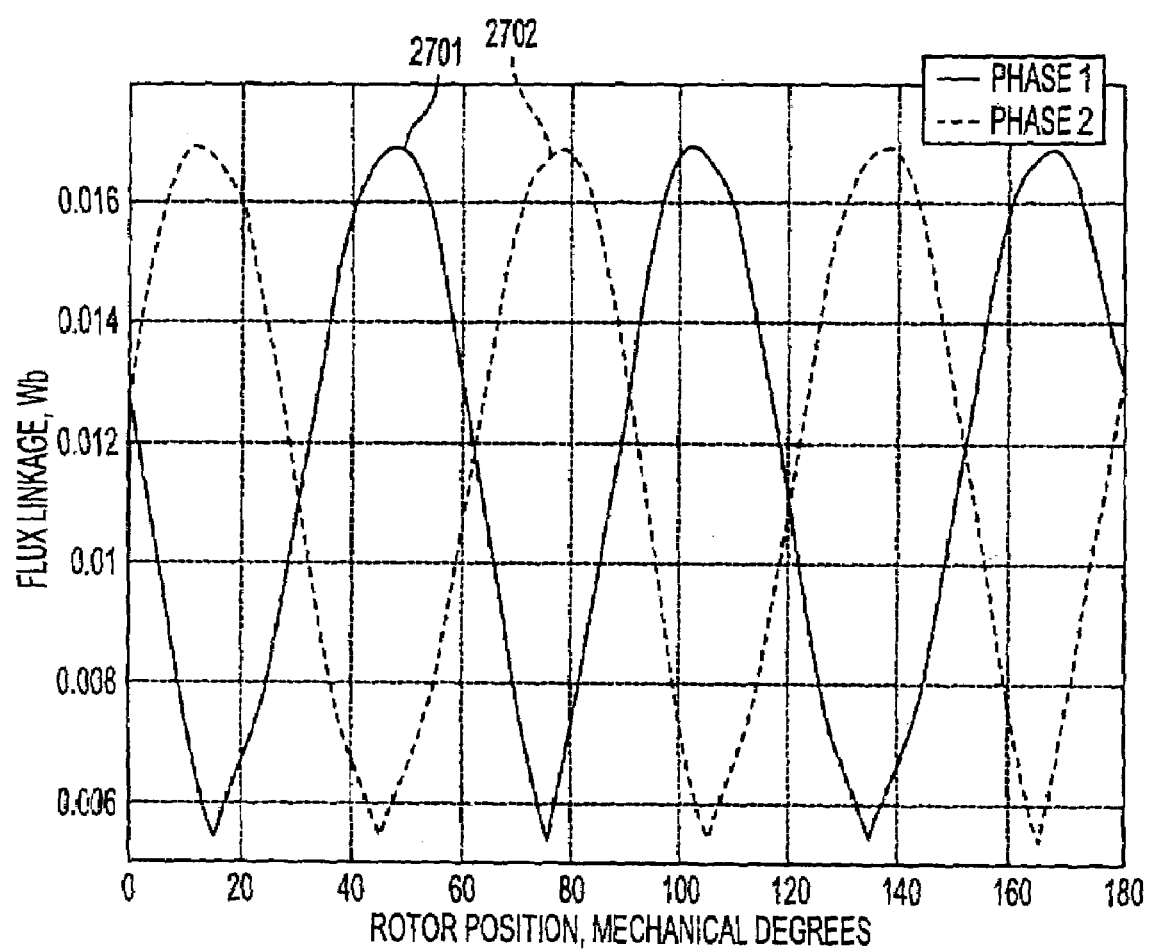
FIG. 27 illustrates a graph of the flux linkages for the TPSRM illustrated by FIG. 26 plotted as a function of rotor position.
Figure 28:
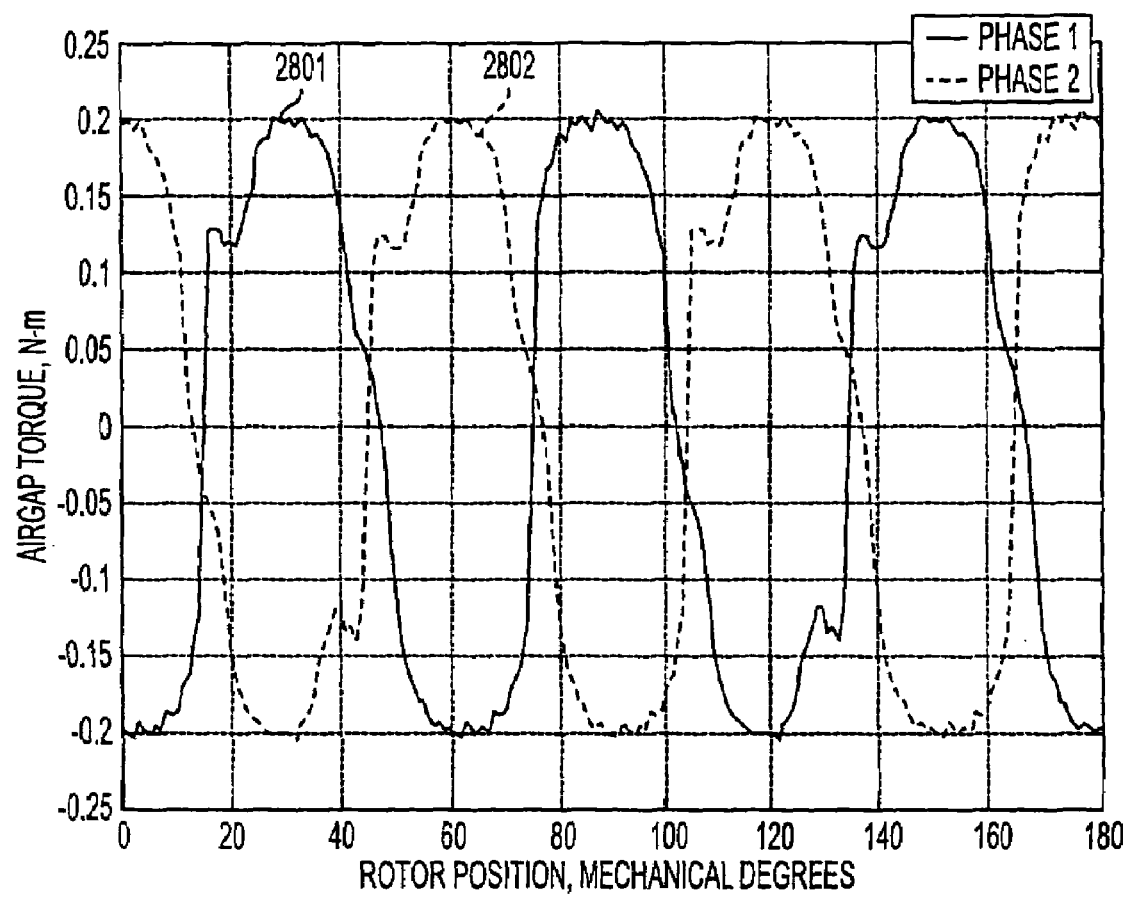
FIG. 28 illustrates a graph of the electromagnetic torque for the TPSRM illustrated by FIG. 26 plotted as a function of its rotor position.

FIG. 26 illustrates the TPSRM of FIG. 25 with the rotor pole slots more realistically illustrated in proportion to the size of their respective rotor poles. FIG. 26 also shows stator windings 2606 wound concentrically around each stator pole 2502. FIG. 27 illustrates a graph of the flux linkages for the TPSRM, illustrated by FIG. 26, plotted as a function of rotor position. FIG. 28 illustrates a graph of the electromagnetic torque for the TPSRM, illustrated by FIG. 26, plotted as a function of its rotor position. As may be seen by inspection of the phase 1 and 2 flux linkages 2701 and 2702, respectively, in FIG. 27, the adjacent pair of rotor poles 2504 generate somewhat similar but positionally shifted flux linkages 2701, 2702. The positionally shifted flux linkages 2701, 2702 create a phase shift of the electromagnetic torque, as may be seen by inspection of the phase 1 and 2 torques 2801 and 2802, respectively, in FIG. 28. The characteristics of the phase 1 and 2 flux linkages 2701, 2702 and the phase 1 and 2 torques 2801 and 2802 are very similar to those illustrated for TPSRM 1100, in FIGS. 12 and 13. For both TPSRM 1100 and TPSRM 2500, the flux linkage and torque characteristics are very smooth, without sharp changes in them. With selective placement of rotor pole slots 2505 (i.e., holes) in rotor poles 2504, very nice shaping of the torque can be achieved for maximizing the starting torque and also the constant torque over a wider range of rotor positions, to yield minimum ripple torque in TPSRM 2500.

Figure 29:
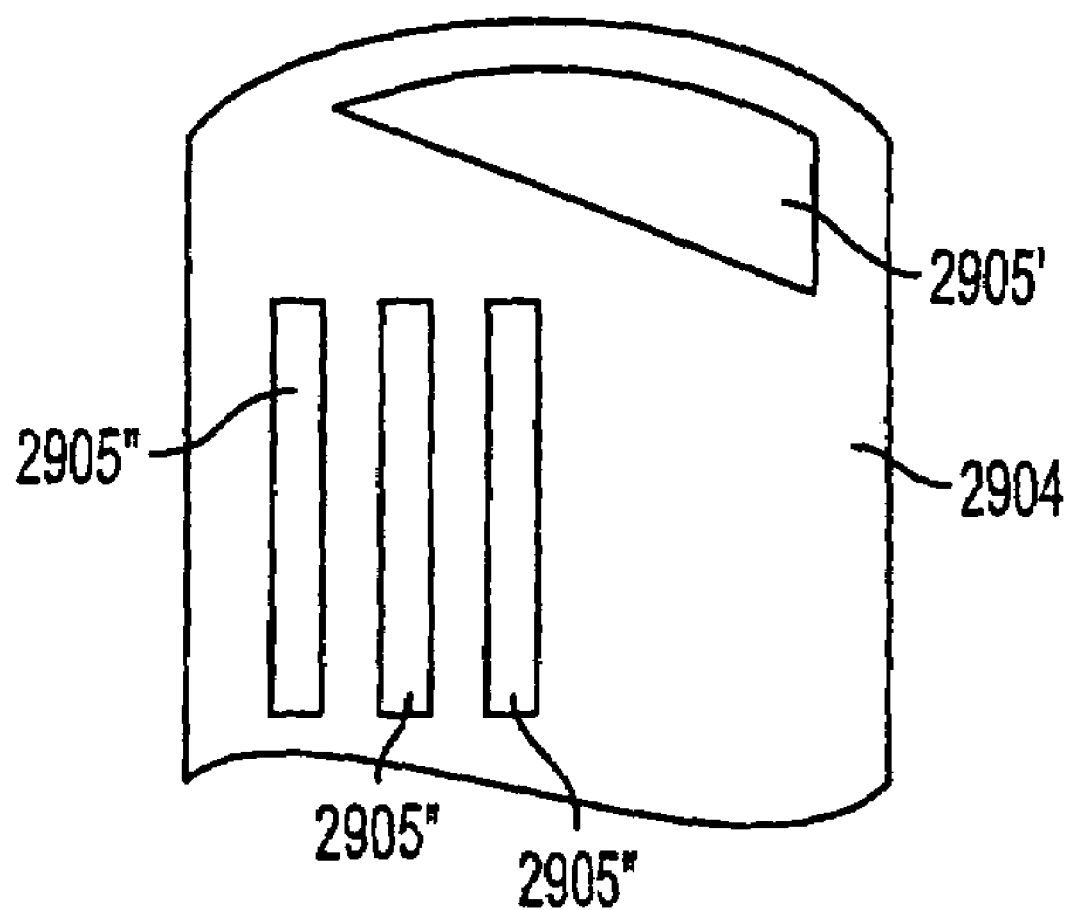
FIG. 29 illustrates a rotor pole having both rectangular and curved slotting.

FIG. 29 illustrates a rotor pole having both rectangular and curved slotting. Slotting of rotor pole 2904 may include forming one or more circumscribed arcs 2905' and one or more rectangles 2905", or any other regular or irregular shape. However, the combined slotting should be placed off-center of the rotor pole's central radial axis to create an asymmetric air gap. This asymmetric air gap yields an asymmetric flux linkage distribution with regard to the rotor position. Such asymmetry in the air gap and the resulting flux linkage distribution produce asymmetric torque, such that a non-zero torque for all rotor positions is produced when the sum of both phase contributions is considered. This feature uniquely enables starting and running of the machine in any direction from any rotor position.

The manner, shape, and size in which rotor pole slots 2905' and 2905" are placed in rotor pole 2904 are determined by the starting torque requirements and by the nature of the application.

Figure 30:
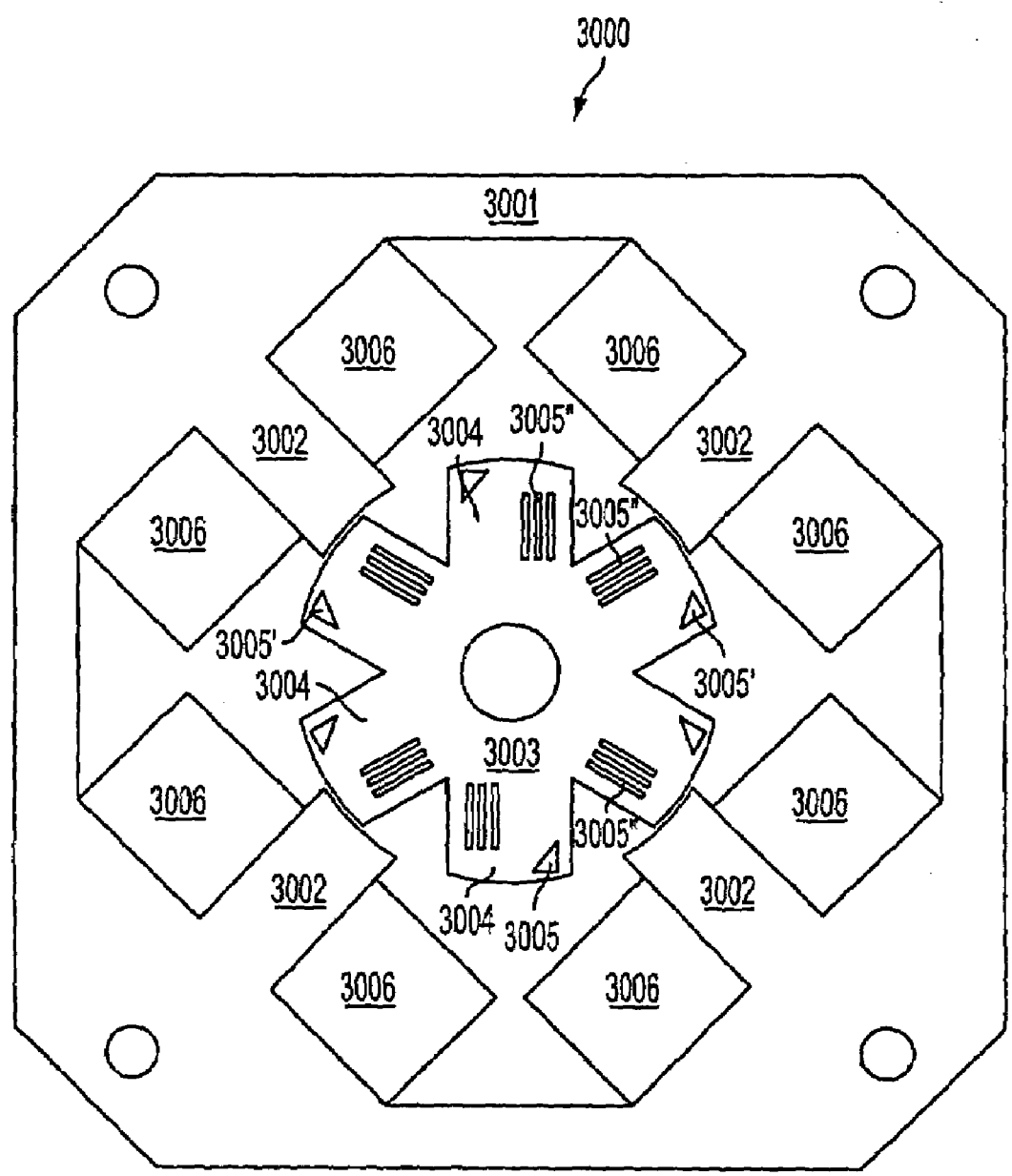
FIG. 30 illustrates a TPSRM having the rotor pole slotting configuration illustrated by FIG. 29.

FIG. 30 illustrates a TPSRM having the rotor pole slotting configuration illustrated by FIG. 29. A TPSRM 3000 has a stator 3001 with four salient stator poles 3002 and a rotor 3003 with six salient rotor poles 3004. Each stator pole 3002 has stator windings 3006 wound concentrically around it. Each rotor pole slot 3005' is formed such that a top edge, which is closest to the distal end of rotor pole 3004, has the same curvature as the distal end arc of rotor pole 3004. A bottom edge of each rotor pole slot 3005' is tapered such that the height between the bottom and top edges of each rotor pole slot 3005' increases with distance from a central radial axis of the respective rotor pole 3004. On the other side of the central radial axis of rotor pole 3004, three rectangular rotor pole slots 3005" are formed. The asymmetric placement of combined rotor pole slots 3005' and 3005", with respect to the central radial axis of rotor poles 3004, assures an asymmetric effective air gap and a non-zero torque characteristic for all rotor positions, when taking into account both phases of TPSRM 3000.

Rotor poles 3004 are positioned diametrically opposite one another on rotor 3003 to have an opposite or mirror image symmetry, about a central radial line passing through the opposing rotor pole pair. Stated another way, each of rotor poles 3004 forming the rotor pole pair has the same symmetry about its respective central radial axis. This configuration distributes the weight of rotor poles 3004 symmetrically. Four of the six adjacent pairs of rotor poles 3004 also have an opposite or mirror image symmetry about their respective central radial axes.

Figure 31:
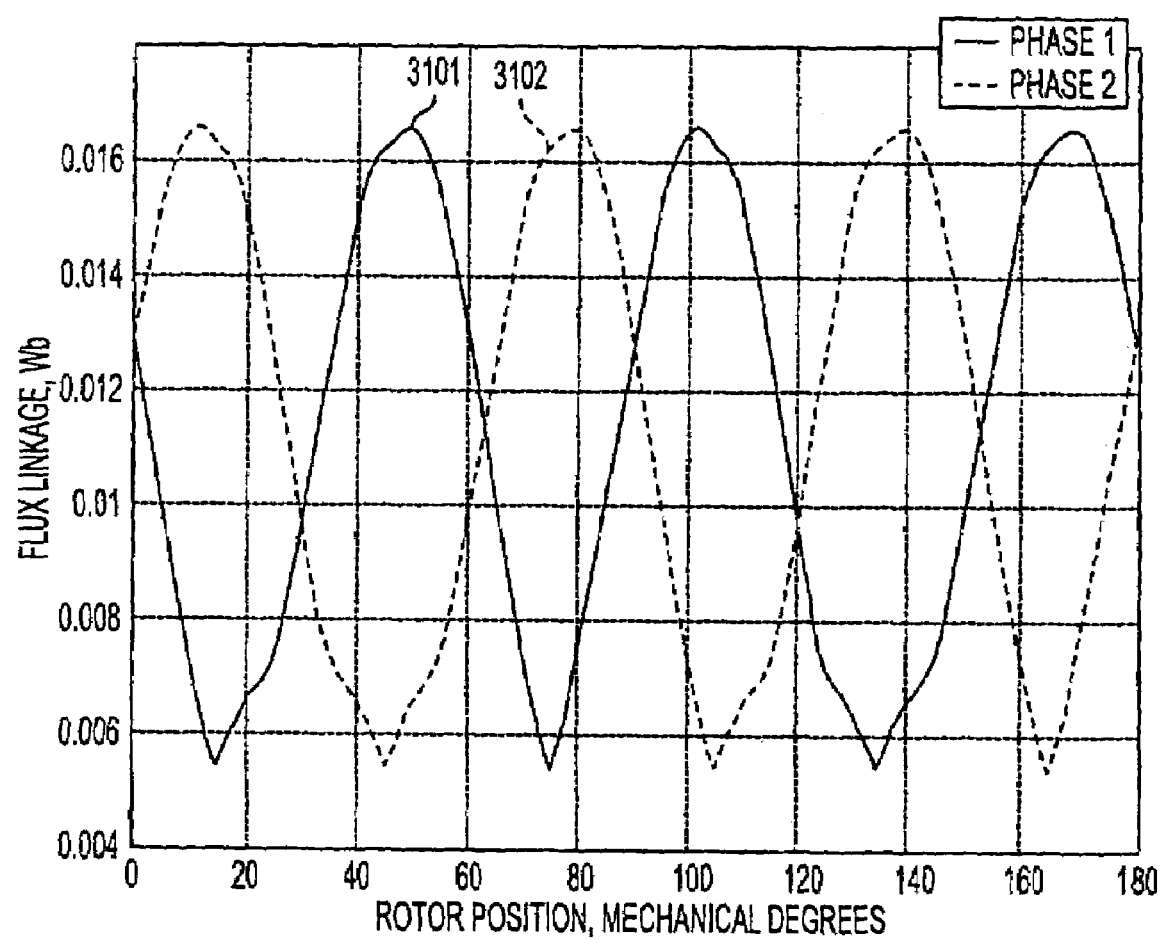
FIG. 31 illustrates a graph of the flux linkages for the TPSRM illustrated by FIG. 30 plotted as a function of rotor position.
Figure 32:
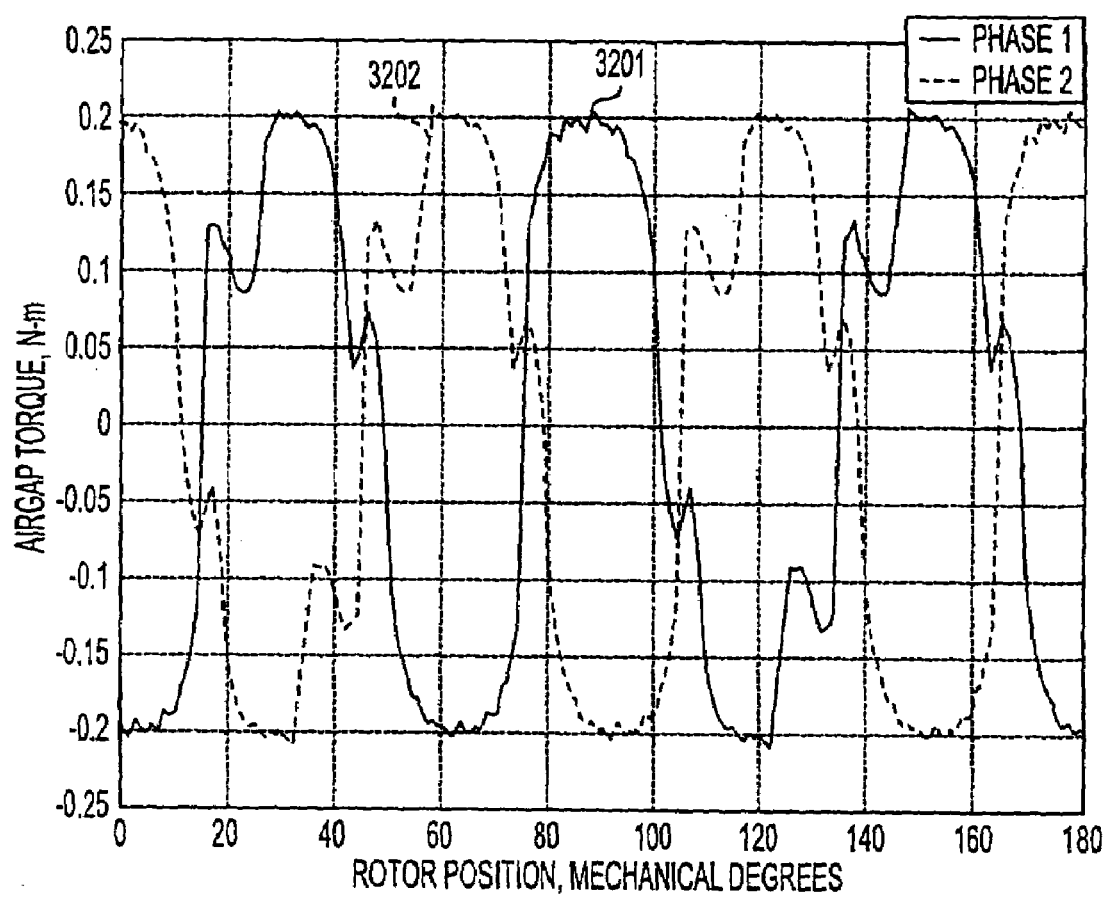
FIG. 32 illustrates a graph of the electromagnetic torque for the TPSRM illustrated by FIG. 30 plotted as a function of its rotor position.

FIG. 31 illustrates a graph of the flux linkages for the TPSRM illustrated by FIG. 30 plotted as a function of rotor position. FIG. 32 illustrates a graph of the electromagnetic torque for the TPSRM illustrated by FIG. 30 plotted as a function of its rotor position. As may be seen by inspection of the phase 1 and 2 flux linkages 3101 and 3102, respectively, in FIG. 31, the adjacent pair of rotor poles 3104 generate somewhat similar but positionally shifted flux linkages 3101, 3102. The positionally shifted flux linkages 3101, 3102 create a phase shift of the electromagnetic torque, as may be seen by inspection of the phase 1 and 2 torques 3201 and 3202, respectively, in FIG. 32. The characteristics of the phase 1 and 2 flux linkages 3101, 3102 and the phase 1 and 2 torques 3201 and 3202 are very similar to those for TPSRM 1100, as illustrated in FIGS. 12 and 13, and for TPSRM 2500 as illustrated in FIGS. 27 and 28. For each of TPSRM 1100, TPSRM 2500, and TPSRM 3000, the flux linkage and torque characteristics are very smooth, without sharp changes in them. With selective placement of rotor pole slots 3005 in rotor poles 3004, very nice shaping of the torque can be achieved for maximizing the starting torque and also the constant torque over a wider range of rotor positions, to yield minimum ripple torque in TPSRM 3000. These flux linkage and torque characteristics are shown for one design, but with changes in the number or size of rotor pole slots 3005' and 3005", the characteristics can be varied to meet the different needs of various applications.

Figure 33:
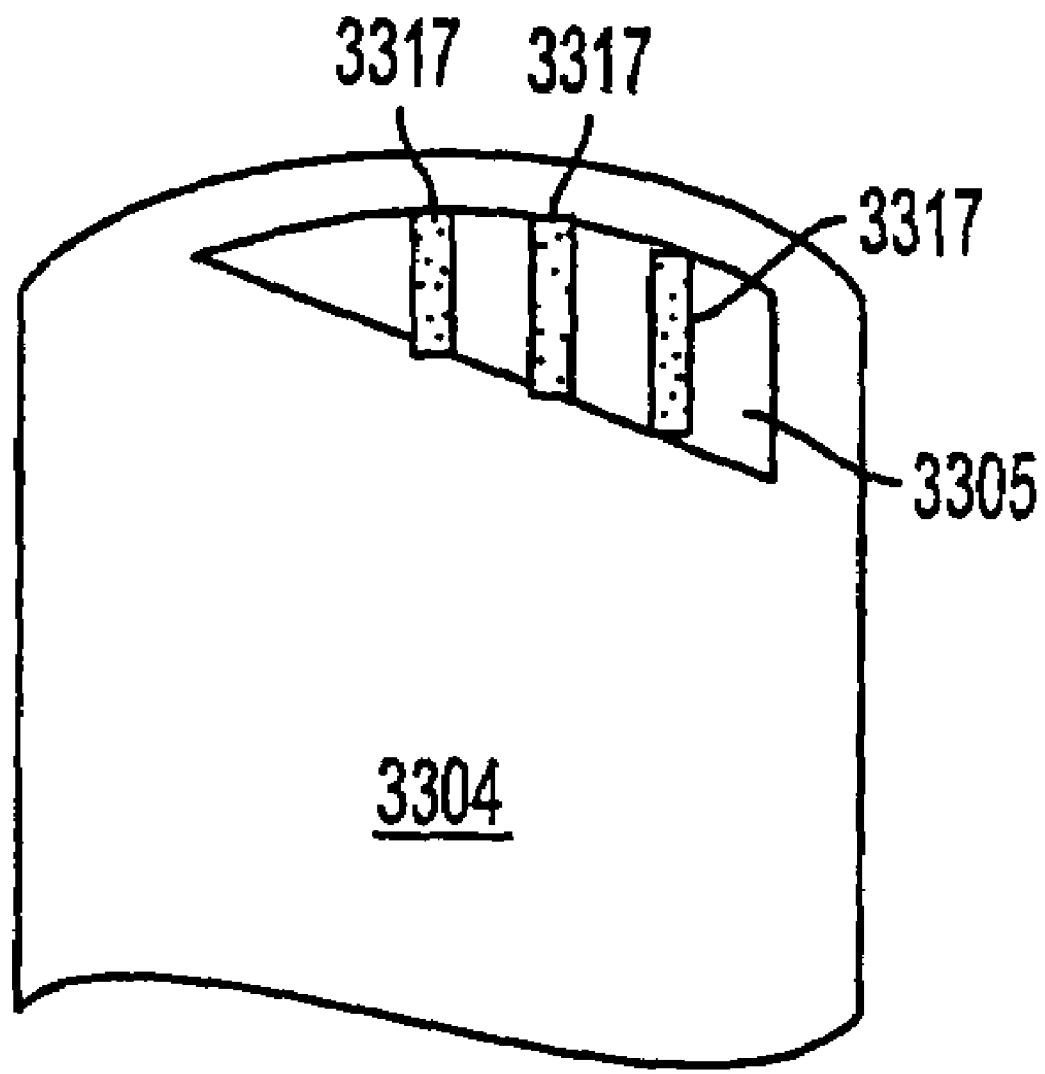
FIG. 33 illustrates a rotor pole having curved slotting with rectangular or arc based steel strips interspersed within the curved slot.

FIG. 33 illustrates a rotor pole having curved slotting with rectangular or arc-based steel strips interspersed within the curved slot. A rotor pole slot 3305 is formed such that a top edge, which is closest to the distal end of rotor pole 3304, has the same curvature as the distal end arc of rotor pole 3304. A bottom edge of each rotor pole slot 3305 is tapered such that the height, between the bottom and top edges of rotor pole slot 3305, increases with distance from a central radial axis of rotor pole 3304.

Rotor pole slot 3305 has an effective air gap that increases with distance away from the central radial axis. Additionally, rotor pole slot 3305 is interspersed with rotor lamination material 3317 to provide a multiplicity of slot portions within rotor pole slot 3305. This configuration combines both curved and rectangular shaped slots into one part of the rotor pole itself. The particular slotting configuration used is selected based on a number of factors, such as the application, starting torque, and acoustic noise. In a two-phase machine, the arrangement of the rotor pole slots can be very similar to that shown in FIG. 30.

TPSRMs 1100, 1400, 2100, 2400, 2500, and 3000 provide the following features or advantages:

1. Rotor pole slots are introduced to generate nonzero torque characteristics in the TPSRMs.

2. The rotor pole slots can employ a number of configurations, which are not limited to the size, shape, location, or number illustrated or described herein.

3. The rotor pole slots may span less than half of the rotor pole arc, generally much less than 35% of the total rotor pole arc.

4. The rotor pole slots are placed in each set of diametrically opposed rotor poles, either on the leading edge or trailing edge, to create the asymmetry in the reluctance-Versus-rotor position relationship and, hence, in the flux linkages.

5. The rotor pole slots of successive rotor poles may face each other, i.e., the order of placement of the rotor pole slots is reversed with respect to each other. In the case of a TPSRM with six rotor poles, this may happen for at least one set of diametrically opposed rotor poles.

6. The shape and dimensions of the rotor pole slots in the rotor are selected as a function of the desired torque characteristics for self-starting.

7. The rotor pole slots may be placed close to one side of the rotor poles and, therefore, asymmetrically with respect to the rotor pole axis. Generally, the slot axis and rotor pole axis, or their effective air gaps do not coincide.

8. Contouring of the stator poles or rotor poles is likewise asymmetric, to create asymmetry in the reluctance.

9. The concept of rotor pole slots and the innovations described here are applicable to higher phase SR machines, for torque shaping.

10. The concepts and innovations of contouring rotor poles or stator poles are directly applicable to higher phase SR machines, for torque shaping.

11. The concepts and innovations described herein are applicable and extendable to linear motion SRMs, for force shaping.

12. Self-starting is achieved with only one rotor pole slot and without requiring a large pole arc in the rotor poles. This has tremendous implications in that the rotor pole arc can be equal to the stator pole arc or, if necessary, may be slightly larger, resulting in low rotor iron weight, low rotor inertia and, hence, in high acceleration of the rotor and also high power density (usually expressed in W/Kg or W/lb) in the machine.

13. The rotor pole slots in the rotor and contouring of the stator or rotor poles are for the purpose of producing nonzero torque characteristics in the TPSRMs and not for the purpose of linearizing the flux linkages-versus-rotor position relationship. This fact is obvious as seen from the figures showing flux linkages-versus-rotor position.

14. Even though there may be negative torque intervals, they can be suitably exploited for starting and not utilized for regular running with the control, as discussed earlier.

15. The TPSRMs are capable of self-starting in both the clockwise and counter clockwise directions.

Another embodiment of the invention is drawn to solving problems relating to the manufacture of and acoustic noise control of switched reluctance and permanent magnet brushless direct current (dc) machines (PMBDCM). Although this embodiment is particularly useful for SRMs and PMBDCMs having two phases, it may be applied any such machines that have more than one phase. The innovations of this embodiment include:

1. Design measures to reduce acoustic noise, and

2. Design measures to secure the concentric stator windings, to enable further reduction in acoustic noise.

The challenge in reducing the acoustic noise in SRMs is addressed in many ways by related art techniques. These techniques include electronic switching control and designing the machine with a large back iron thickness, as described in "Switched Reluctance Motor Drives", R. Krishnan, CRC Press, June 2001. While these measures have yielded an SRM that has an acoustic noise comparable to other kinds of machines, there are still additional ways available to reduce the acoustic noise in the machine.

Radial, also known as normal, forces predominantly generate the acoustic noise present in electrical machines. Therefore, one way to reduce the acoustic noise is to minimize the radial forces. This can be accomplished at the machine design stage. However, the ratio between the radial and tangential forces can only be minimized to a particular level, beyond which the useful tangential force is penalized. Then, other measures are required.

One way to reduce the acoustic noise is to minimize the radial forces to a level that is unavoidable in an SRM, due to manufacturing tolerances. Then, the impact of these radial forces on the stator structure may be reduced by increasing the iron path in the stator pole and its back iron. This can be implemented in a two-phase SRM, or for that matter in a concentrically wound PMBDCM. However, for the PMBDCM, the acoustic noise is much smaller because it has a larger equivalent air gap compared to the SRM, since the PMBDCM's permanent magnets act as though they are air gaps.

Figure 34:
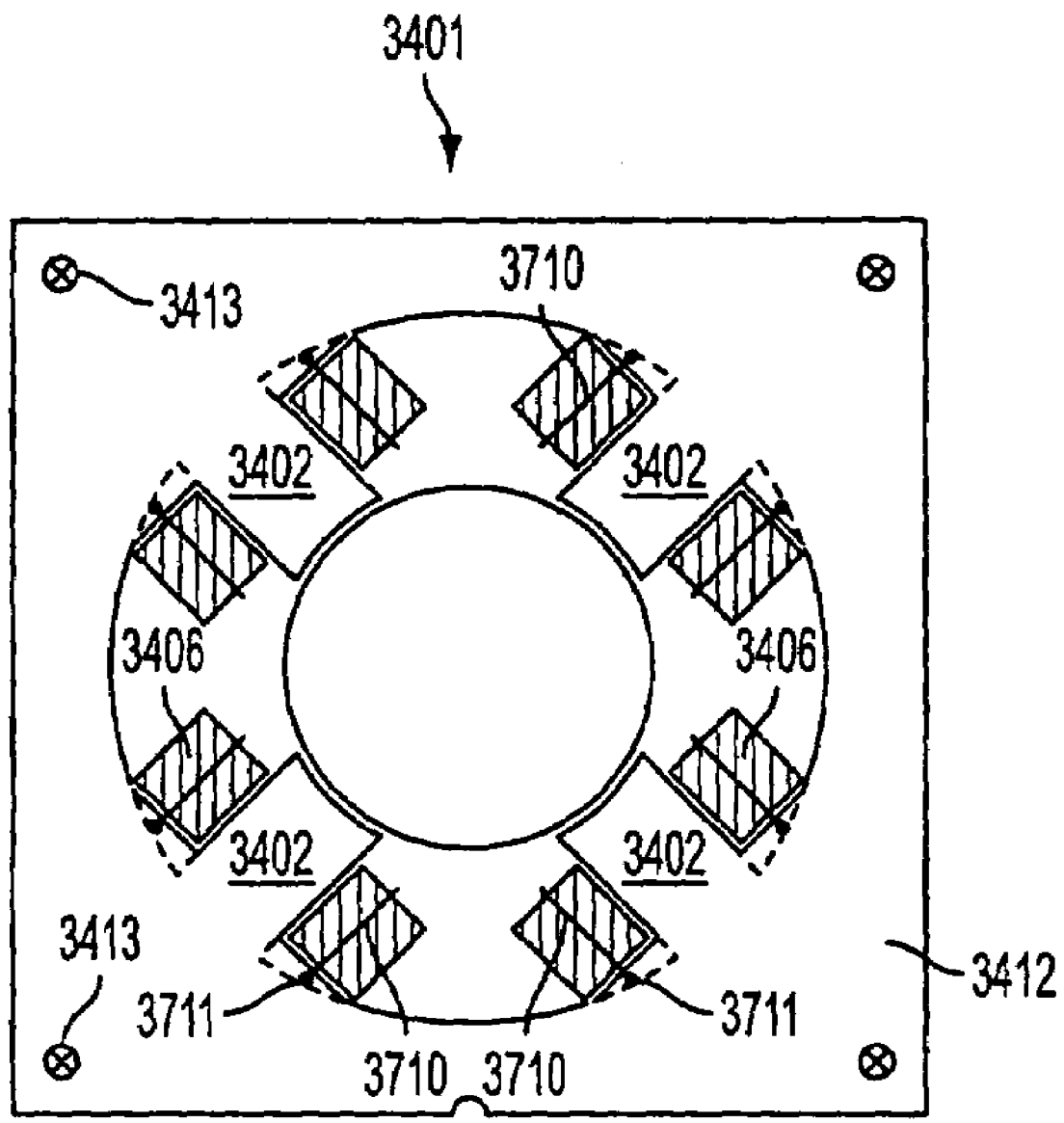
FIG. 34 illustrates a four-pole stator having its poles located in the inner corners of the stator laminations.

FIG. 34 illustrates a four-pole stator having its poles located in the inner corners of the stator laminations. A stator 3401 has four stator poles 3402 that are each disposed in a separate corner of stator laminations 3412. Each stator pole 3402 has stator windings 3406 wound concentrically around it.

Figure 35:
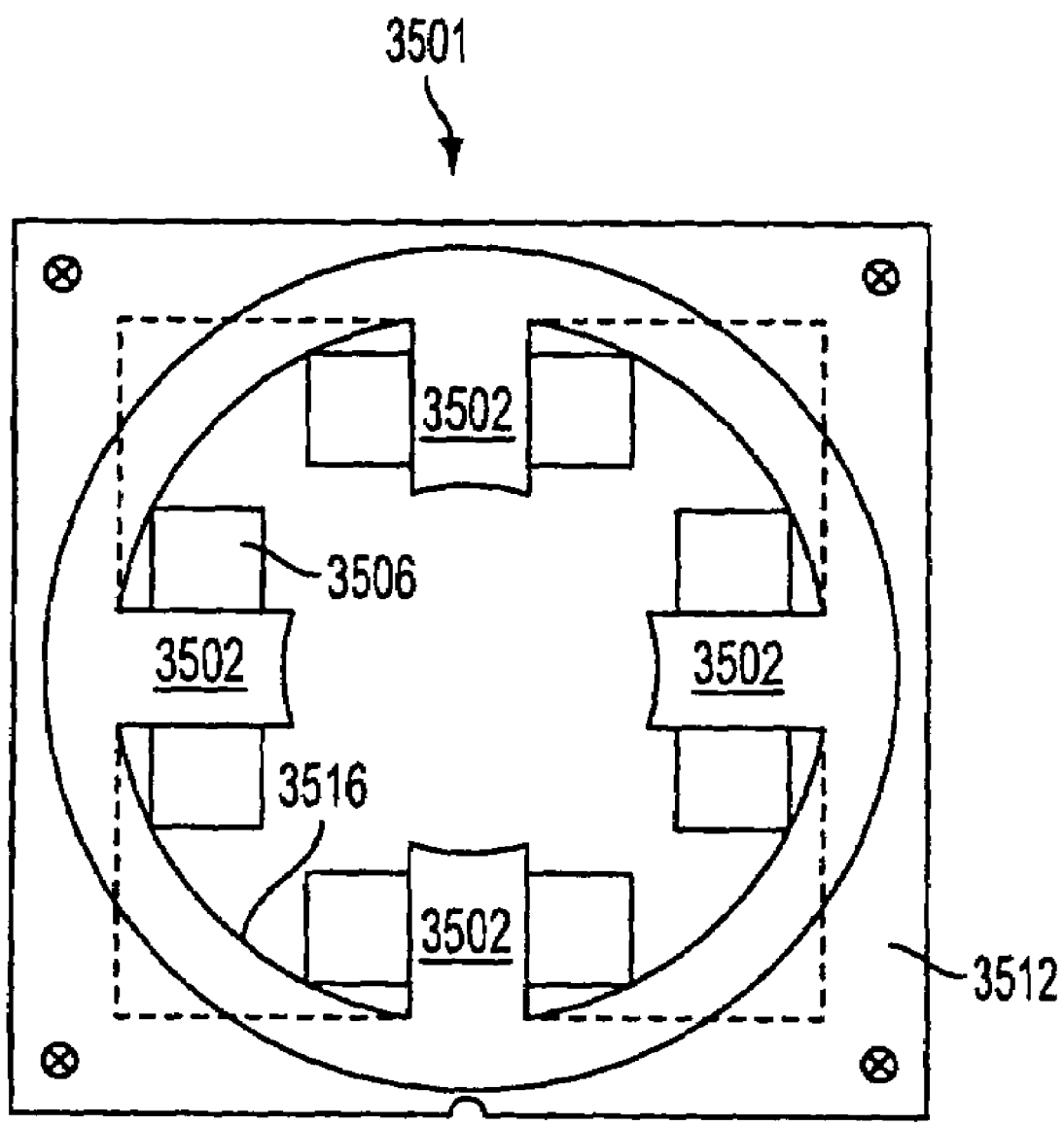
FIG. 35 illustrates a related art four-pole stator having its poles located midway between the inner corners of the stator laminations.

FIG. 35 illustrates a related art four-pole stator having its poles located midway between the inner corners of the stator laminations. A stator 3501 has four stator poles 3502 that are each disposed in a separate corner of stator laminations 3512. Each stator pole 3502 has phase windings 3506 wound concentrically around it.

Figure 36A:
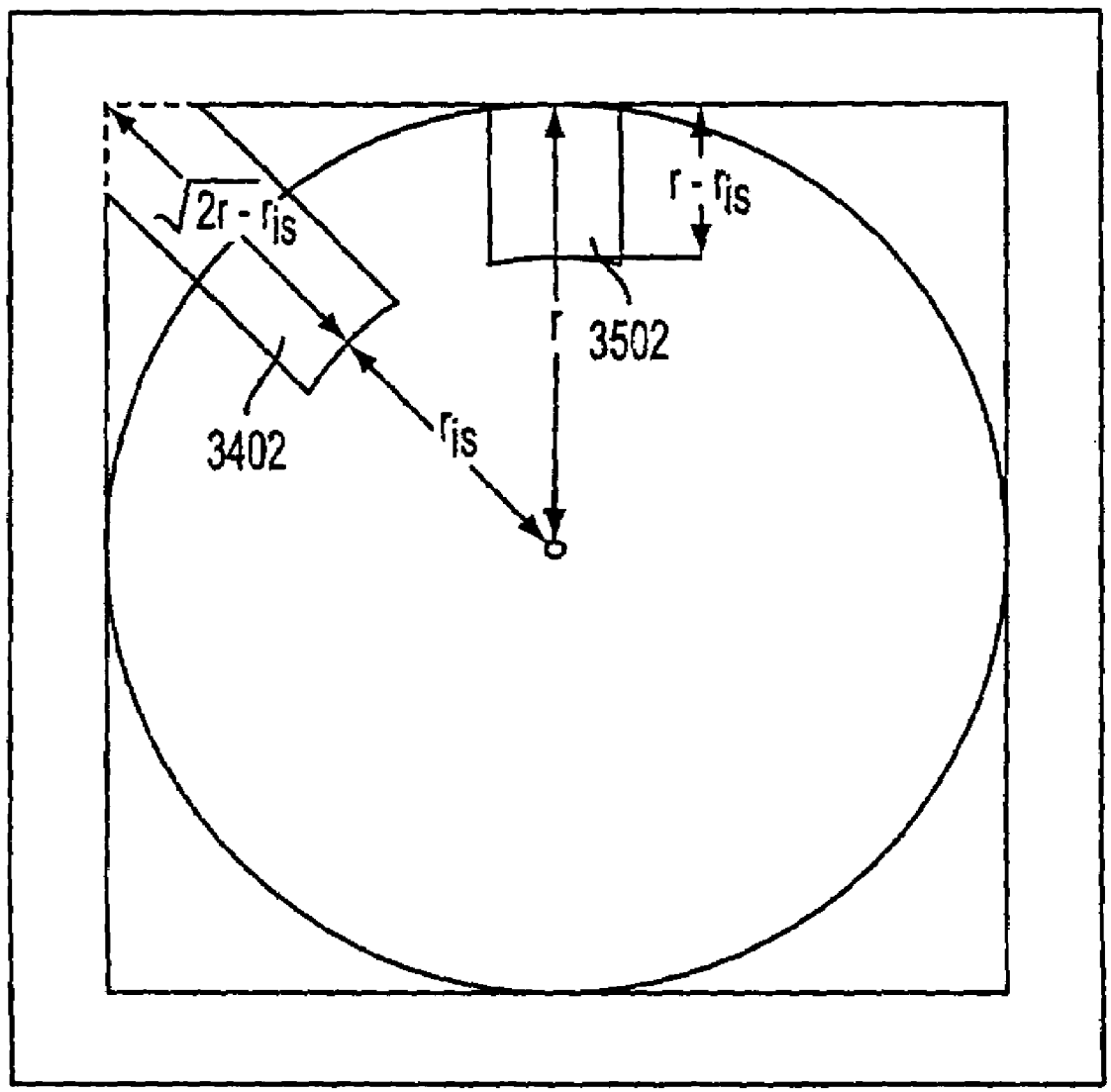
FIG. 36(a) illustrates a comparison of the stator pole and back iron lengths for the stators illustrated by FIGS. 24 and 35.
Figure 36B:
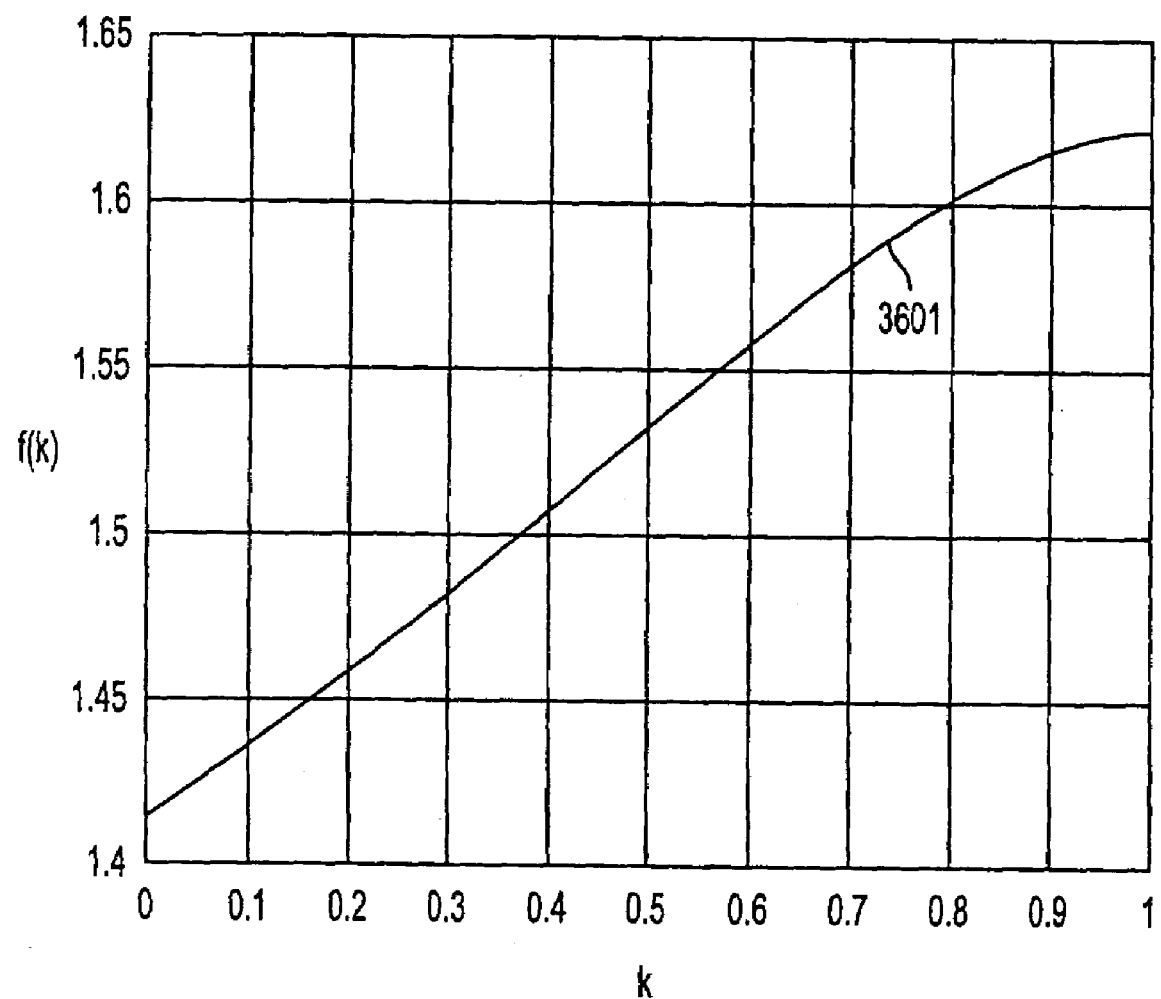
FIG. 36(b) illustrates a plot of the stator pole length as a function of the ratio of inner circle radii between the stator poles of FIGS. 34 and 35.

FIG. 36(*a*) illustrates a comparison of the stator pole and back iron lengths for stators 3401 and 3402, illustrated by FIGS. 24 and 35, respectively. Compared to placing the stator poles midway between the four corners, as illustrated in. FIG. 35, the placement of stator poles 3502 in the corners of stator 3401 increases the length of the stator pole and its back iron considerably. More specifically, this particular placement of stator poles 3502 increases the stator pole length from a length given by $r-r_{is}$ to $1.414r-r_{is}$, where r is the radius of the inner circle in the square stator lamination and $r_{is}$ is the inner radius of the stator lamination at the stator pole tips, as shown in FIG. 36(*a*).

Defining k as the ratio between $r_{is}$ and r, the increase in the stator pole length can be expressed as $f(k)=(1.44-k)/(1-k)$. FIG. 36(*b*) illustrates a plot of the stator pole length as a function of the ratio of inner circle radii between the stator poles of FIGS. 34 and 35. Curve 3601 shows that the pole length effectively increases by a factor of 45% to 75%, or so, with this strategy.

This strategy does not decrease the radial forces, but provides enhanced acoustic impedance, to minimize the stator vibrations that cause the acoustic noise in the machine. As may be seen by inspection of FIG. 34, the stator bolt holes 3413 do not interfere with the flux paths in the stator. By contrast to this configuration, stator bolt holes 3413 in the circular stator laminations 3512 of stator 3501 do have a detrimental impact on the stator flux paths, if additional stator back iron thickness is not built into the design.

Figure 37:
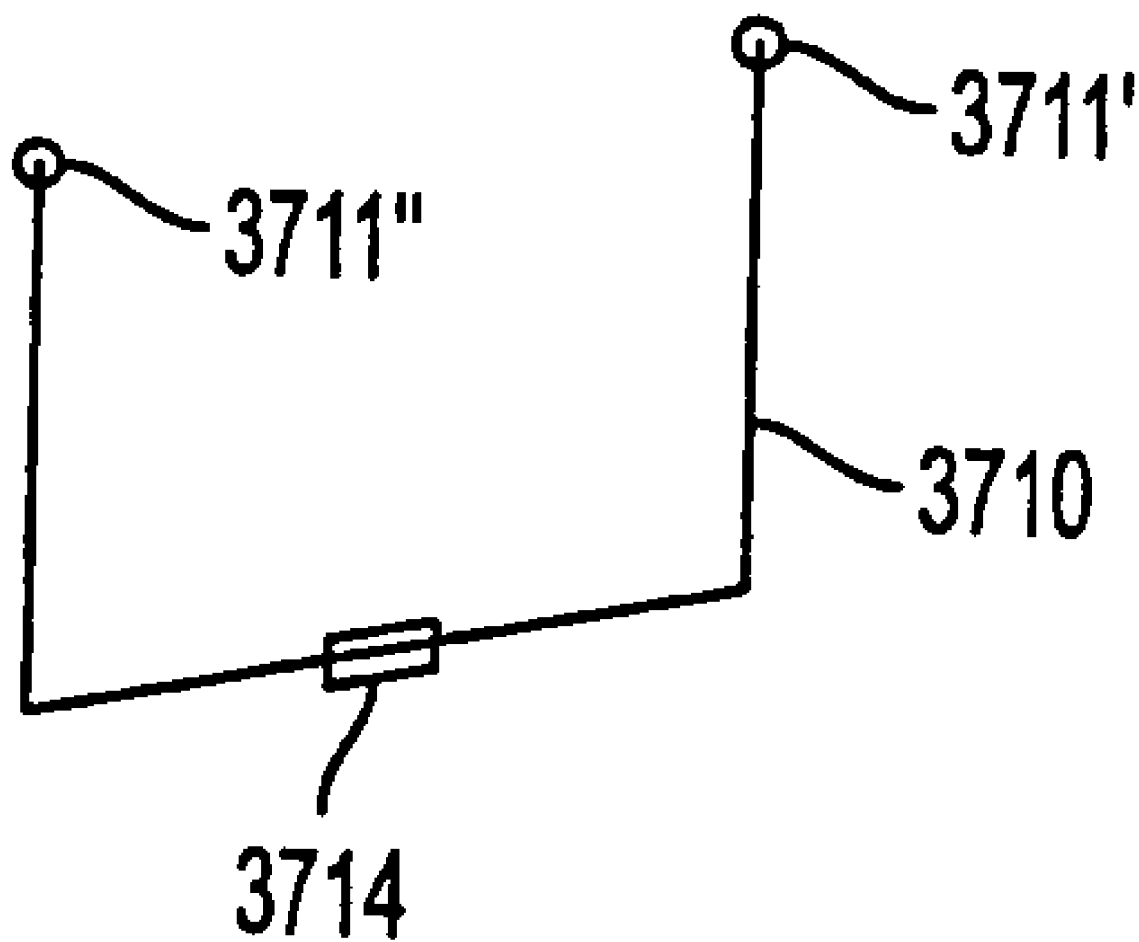
FIG. 37 illustrates a coil wrap for securing the stator winding to the stator.

FIG. 37 illustrates a coil wrap for securing the stator winding to the stator. Referring now to FIGS. 34 and 37, a steel wire coil wrap 3710 is inserted into front-side 3711' and back-side 3711" of stator laminations hole 3711, which is punched in stator laminations 3412. Coil wrap 3710 is run over stator winding 3406 and welded on an outer part 3714 of winding 3406. Alternatively, coil wrap 3710 can be welded onto one side 3711'/3711" of stator laminations hole 3711 and then wrapped around stator winding 3406 and pulled with tension. Then, coil wrap 3710 is inserted in the other side 3711"/3711' of stator laminations hole 3711 and welded to keep stator winding 3406 in place. This coil wrapping process may be performed for the portion of stator winding 3406 extending on each side of stator pole 3402 and for each of the four stator poles. Wrapping stator windings 3406 with coil wraps 3710 completely eliminates the need for wedges, as used in related art devices.

Alternatively, industrial grade twine or nylon twine may be used as coil wrap 3710, instead of using steel wire. In the case of using twine, coil wrap 3710 may be used to tie each stator winding 3406 to stator laminations 3412. In order to facilitate the securing process, two holes can be used for securing the stator winding on one side, instead of only one hole. The advantage of using twine is that it is flexible and no welding is required, as required for steel wire.

The wedges of related art devices may sometimes be easier to install than wire wraps, when used with stator poles having an overhang, a lip, or a pole shoe-like structure to provide support for securing the wedges. However, the disadvantage of using wedges with one of these securing structures is that the winding insertion is difficult, unless it is machine wound and inserted as a single operation, thus leading to higher manufacturing costs.

SRM stator poles generally do not have overhangs, lips, or pole shoes, for the primary reason of achieving low manufacturing cost in punching the lamination. Also, the omission of these securing structures supports easier installation of the coils, without too many machine-based manufacturing operations.

The coil wraps 3710 disclosed herein are simpler to install, much stronger, and use the stator lamination core for securing the windings, without affecting the main flux paths and without interfering with the regular flux paths. As seen from FIG. 34, the iron removed to make stator laminations holes 3711, which secure coil wraps 3710, does not affect the area required for flux flow and, therefore, does not increase the flux density in the stator iron. In short, these holes do not affect the machine electro-magnetically. If such holes are punched in the related art stator, illustrated by FIG. 35, the loss of iron will distort the flux flow, create increased flux density in the stator iron, and produce higher core losses. Therefore, placing stator poles and coils in the corners of square laminations provides an ideal and natural arrangement for foothold holes in the laminations.

Figure 38:
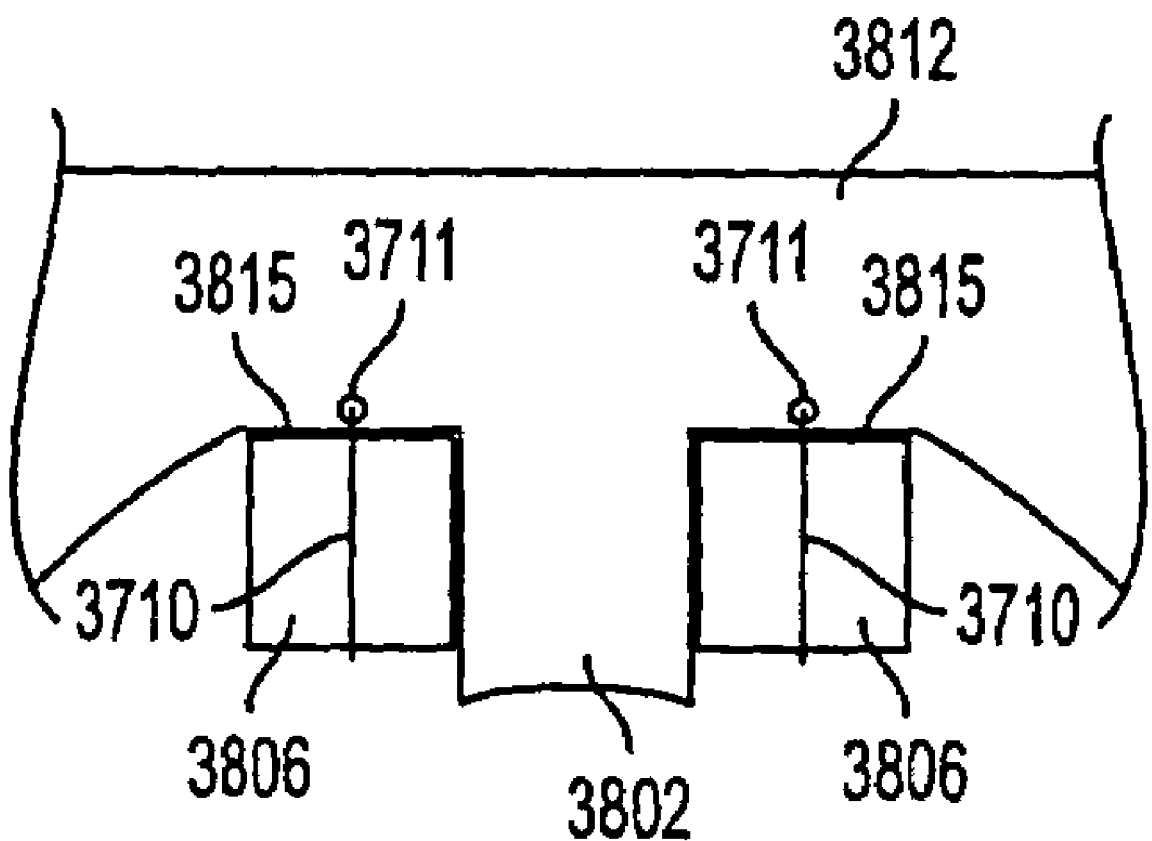
FIG. 38 illustrates a structure for securing stator windings when the stator poles are centered between the corners of the stator laminations.

FIG. 38 illustrates a structure for securing stator windings when the stator poles are centered between the corners of the stator laminations. Stator laminations 3812 are beveled to have a flat base 3815 circumscribing stator poles 3802. Stator winding 3806 is wound around stator pole 3802 and the wire coil forming stator winding 3806 completely abuts flat base 3815. Stator winding 3806 is secured to stator laminations 3812 with coil wraps 3710, by way of stator laminations holes 3711.

By beveling the stator pole base flat, instead of using an arcuate base 3516, as illustrated by FIG. 35, enough space is obtained to provide the stator holes that secure the coils. This space does not interfere with the main flux path and does not lead to higher flux density or higher core losses. Such an arrangement is an extension of the securing technique illustrated by FIGS. 34 and 37.

The securing structure, illustrated by FIG. 38, provides the advantage of bringing the stator winding coil in contact with both the stator's back iron and the stator pole sides. This arrangement provides the maximum contact area for heat dissipation and a higher thermal robustness for the machine. As a result, this arrangement increases the power density of the machine, as its coil temperature is lower for the same power output of the machine. Related art SRM coils only have physical contact with the sides of the stator poles and little if any contact with the stator back iron. As a result, these related art SRMs have a higher coil temperature, because of the poor thermal conduction path.

The stator structures and coil wraps illustrated by FIGS. 34-38 support or provide the following features or advantages:

1. A two-phase SRM or PMBDCM with four poles located in the corners of the stator laminations, to reduce the acoustic noise.

2. Corner poles that provide enhanced acoustic impedance to the stator vibrations, caused by radial forces that are, in turn, induced by the magnetic forces and exacerbated by the manufacturing tolerances.

3. Corner poles that do not interfere with the mechanical securement of the stator laminations, and stator lamination bolts that do not interfere with the magnetic paths and, hence, the force or flux production in the machines.

4. Stator windings may be secured without wedges.

5. The coil wraps used to secure the windings do not interfere with the magnetic flux path.

6. The coil wraps used to secure the windings are extendable to multi-phase, concentrically wound stator windings of SRMs and PMBDCMs.

7. The coil wraps may be a non-magnetic and non-electrically conducting material.

8. The coil wraps may be spot-welded, in the case of wires, or tied, in the case of twine or plastic wraps. The tension in the wire wraps can be adjusted by initial force and adjusting the length of the wire wraps.

9. The stator coils may be secured in a manner that provides them with substantial contact to both the stator poles and the stator back iron. This feature helps lower the temperature in the stator coils during machine operation. Lowering the temperature increases the longevity of the machine coils and increases the reliability of the machine, since the coils are less likely to fail and their insulation is less likely to break down.

10. The stator windings can be secured with industrial grade polymer twine or nylon grade twine, to provide simplicity in the production process. Also, more than one hole may be used to secure the stator windings with the twine.

The foregoing description illustrates and describes the present invention. However, the disclosure shows and describes only the preferred embodiments of the invention, but it is to be understood that the invention is capable of use in various other combinations, modifications, and environments. Also, the invention is capable of change or modification, within the scope of the inventive concept, as expressed herein, that is commensurate with the above teachings and the skill or knowledge of one skilled in the relevant art.

The embodiments described herein are further intended to explain best modes known of practicing the invention and to enable others skilled in the art to utilize the invention in these and other embodiments, with the various modifications that may be required by the particular applications or uses of the invention. Accordingly, the description is not intended to limit the invention to the form disclosed herein.

What is claimed is:

1. A rotor for a two-phase switched reluctance motor, comprising:
    a plurality of salient rotor poles that each have asymmetric reluctances about a central radial axis of the respective rotor pole, wherein:
    each of the rotor poles has the same rotor pole face arc,
    two of the rotor poles are adjacently positioned on the rotor and the asymmetric reluctances of the two rotor poles have substantially the opposite symmetry, about their respective central radial axes, and
    the rotor poles are operable to provide preferential torque generation in one direction of rotation for all rotor positions, under the influence of an electromagnetic flux provided by a plurality of salient stator poles having a pitch that is greater than the rotor pole face arc.

2. The rotor of claim 1, wherein the rotor poles do not have an extended arcuate portion at a distal end of the respective poles.

3. The rotor of claim 1, wherein:
    two of the plurality of rotor poles are disposed radially opposite one another on the rotor; and
    the asymmetric reluctances of the two rotor poles have substantially the same symmetry, about their respective central radial axes.

4. The rotor of claim 1, wherein the rotor is balanced about an axis of rotation.

5. The rotor of claim 1, wherein:
    the plurality of rotor poles are provided in pairs positioned radially opposite one another on the rotor; and
    for each pair of rotor poles, the asymmetric reluctances of the paired rotor poles have substantially the same symmetry, about their respective central radial axes.

6. The rotor of claim 5, wherein for at least two pairs of adjacent rotor poles, the asymmetric reluctances of the adjacently paired rotor poles have substantially the opposite symmetry, about their respective central radial axes.

7. The rotor of claim 6, wherein for at least another two pairs of adjacent rotor poles, the asymmetric reluctances of the adjacently paired rotor poles have substantially the same symmetry, about their respective central radial axes.

8. The rotor of claim 1, wherein the rotor poles are slotted to provide the asymmetric reluctance.

9. The rotor of claim 8, wherein each of the rotor poles is slotted on both sides of its central radial axis.

10. The rotor of claim 8, wherein one or more of the slots are partially filled with a permanent magnet.

11. The rotor of claim 8, further comprising a rotor position sensor disposed in one of the slots.

12. The rotor of claim 1, wherein the rotor poles are peripherally contoured to provide the asymmetric reluctance.

13. The rotor of claim 1, wherein:
    the rotor poles are peripherally contoured at their distal ends to provide the asymmetric reluctance; and
    for each rotor pole, a portion of the distal end on each side of the rotor pole's central axis is contoured to have an arc different from that of a circular arc.

14. A rotor for a two-phase switched reluctance motor, comprising:
    a plurality of salient rotor poles that are each peripherally contoured to provide asymmetric reluctance about a central radial axis of the respective rotor pole, wherein:
    each of the rotor poles has the same rotor pole face arc, and
    the rotor poles are operable to provide preferential torque generation in one direction of rotation for all rotor positions, under the influence of an electromagnetic flux provided by a plurality of salient stator poles having a tooth pitch that is greater than the rotor pole face arc.

15. A rotor for a two-phase switched reluctance motor, comprising:
    a plurality of salient rotor poles, each rotor pole is peripherally contoured at its distal end to provide asymmetric reluctance about a central radial axis of the rotor pole, wherein:
    each of the rotor poles has the same rotor pole face arc,
    for each rotor pole, a portion of the distal end on each side of the rotor pole's central axis is contoured to have an arc different from that of a circular arc, and
    the rotor poles are operable to provide preferential torque generation in one direction of rotation for all rotor positions, under the influence of an electromagnetic flux provided by a plurality of salient stator poles having a tooth pitch that is greater than the rotor pole face arc.

* * * * *